US011544030B2

(12) United States Patent
Ohno et al.

(10) Patent No.: US 11,544,030 B2
(45) Date of Patent: *Jan. 3, 2023

(54) REMOTE WORK-SUPPORT SYSTEM

(71) Applicant: HITACHI, LTD., Tokyo (JP)

(72) Inventors: Chiyo Ohno, Tokyo (JP); Naohito Ikeda, Tokyo (JP); Toshiki Ishii, Tokyo (JP); Satoshi Ouchi, Tokyo (JP); Taku Hoshizawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,239

(22) Filed: Sep. 30, 2021

(65) Prior Publication Data

US 2022/0019399 A1 Jan. 20, 2022

Related U.S. Application Data

(63) Continuation of application No. 16/910,746, filed on Jun. 24, 2020, now Pat. No. 11,169,764.

(30) Foreign Application Priority Data

Jul. 1, 2019 (JP) .............................. JP2019-122778

(51) Int. Cl.
*G06F 3/14* (2006.01)
*G06F 3/01* (2006.01)
(Continued)

(52) U.S. Cl.
CPC ............ *G06F 3/1454* (2013.01); *G06F 3/011* (2013.01); *G06F 3/0485* (2013.01); *G06V 40/20* (2022.01)

(58) Field of Classification Search
CPC ...... G06F 3/011; G06F 3/0485; G06F 3/1454; G06F 3/147; G06K 9/00335;
(Continued)

(56) References Cited

U.S. PATENT DOCUMENTS 11,138,436 B2 * 10/2021 Powderly .................. G06T 3/40
2006/0170652 A1 8/2006 Bannai et al.
(Continued)

FOREIGN PATENT DOCUMENTS

CN 109413376 A 3/2019
JP 2006-293605 A 10/2006
(Continued)

OTHER PUBLICATIONS

Chinese Office Action dated May 5, 2022 for Chinese Patent Application No. 202010557906.9.

*Primary Examiner* — Nelson M Rosario
(74) *Attorney, Agent, or Firm* — Volpe Koenig

(57) ABSTRACT

Provided is a remote work-support system including a first display device to be worn on a first user working at a work site, a surrounding imaging device disposed on the work site, and an information processing device provided at a predetermined spot, configured to be communicable with the first display device and the surrounding imaging device, and operated by a second user. The first display device includes a first communication unit transmitting first image data to the information processing device. The surrounding imaging device includes a second communication unit transmitting second image data to the information processing device. The information processing device includes second display devices displaying the first and second image data, an operation unit through which data is input, and a third communication unit transmitting data input by the second user through the operation unit to the first display device.

10 Claims, 14 Drawing Sheets

(51) Int. Cl.
*G06F 3/0485* (2022.01)
*G06V 40/20* (2022.01)

(58) Field of Classification Search
CPC .......... G06Q 10/101; G02B 2027/0138; G02B 2027/014; G09G 2370/022
See application file for complete search history.

(56) References Cited

U.S. PATENT DOCUMENTS

| | | |
|---|---|---|
| 2007/0132663 A1 | 6/2007 | Iba et al. |
| 2011/0115703 A1 | 5/2011 | Iba et al. |
| 2016/0321022 A1 | 11/2016 | Kajita et al. |
| 2018/0210206 A1* | 7/2018 | Eronen ................ G06T 19/006 |
| 2019/0058818 A1 | 2/2019 | Shimura et al. |
| 2020/0005538 A1 | 1/2020 | Neeter |

FOREIGN PATENT DOCUMENTS

| | | |
|---|---|---|
| JP | 2007-163634 A | 6/2007 |
| JP | 2018-026692 A | 2/2018 |

\* cited by examiner

EXAMPLE OF DETECTING WORKER DISPATCH

EXAMPLE OF DETECTING SURROUNDING CAMERA BEING SET

EXAMPLE OF ERROR SCREEN

EXAMPLE OF ERROR COUNTERMEASURE SCREEN

REMOTE WORK-SUPPORT SYSTEM

CROSS-REFERENCE TO RELATED APPLICATIONS

This application is a continuation of U.S. Ser. No. 16/910,746, filed Jun. 24, 2020, which claims the benefit of priority from Japanese Patent Application No. JP 2019-122778, filed Jul. 1, 2019, the entire contents of which are incorporated herein by reference.

BACKGROUND OF THE INVENTION

1. Field of the Invention

The present invention relates to a remote work-support system.

2. Description of the Related Art

In recent years, so-called wearable information display terminals and the like which each displays predetermined argumented reality (AR), mixed reality (MR), or virtual reality (VR) information using a glasses-type head-mounted display have begun to appear on the market. In addition to AR, MR, and VR, wearable terminals which each includes an interface that appeal to the five senses of humans, such as voice, display, vibration, temperature, smell, taste, an electric signal, stimulation, and the like have also begun to appear on the market. Along with this, in this type of wearable terminals, various methods relating to control of the AR information display terminal and the like and various utilizations have been proposed. As an example, the paragraphs 0118 and 0119 of the specification of JP 2007-163634 A discloses that when "the behavior state of the user U is determined to be "non-walking" on the basis of the detection result from the acceleration sensor or the like as described above, the mode is automatically switched to the detailed mode. Further, in accordance with the table illustrated in FIG. 17, an item is selected from each of the display fields of "Sender", "Title", "Sending time", "Cc", and "Body". As a result, as illustrated in FIG. 16B, detailed character information is displayed on the entire screen." "In contrast, when the behavior state of the user U is determined to be "walking" on the basis of the detection result from the acceleration sensor or the like, the mode is automatically switched to the summary mode. Further, an item is selected from each of the display fields of "icon" and "sender" according to the table illustrated in FIG. 17. As a result, as illustrated in FIG. 16A, the user U causes only the icon and the sender's name to be displayed with characters larger than those in the detailed mode, on part of the central area of the screen."

SUMMARY OF THE INVENTION

Incidentally, in a case where a wearable terminal is applied to industrial use, maintenance use, or the like, for example, a worker on site wears the wearable terminal. At the same time, for example, there is a request that a manager or the like at a remote place acquire data collected from the wearable terminal via a network and check the work situation. However, simply transmitting data collected from the wearable terminal to the manager or the like may not allow the worker and the manager or the like to appropriately cooperate.

The present invention has been made in view of the above circumstances, and an object of the present invention is to provide a remote work-support system that allows a plurality of users to appropriately cooperate.

In order to solve the above problems, a remote work-support system according to the present invention includes a first display device to be worn on a first user working at a work site, a surrounding imaging device disposed at the work site, and an information processing device provided at a predetermined spot, configured to be communicable with the first display device and the surrounding imaging device, and operated by a second user, the first display device including a first display unit that displays information to the first user, a first imaging unit that captures an image in front of the first display device and outputs first image data, and a first communication unit that transmits the first image data to the information processing device, the surrounding imaging device including a second imaging unit that outputs second image data including an imaging range different from an imaging range of the first image data, a transmission control unit that performs a low-resolution process or a high-resolution process on the second image data as necessary, and a second communication unit that transmits the second image data to the information processing device, and the information processing device including a second display device that displays the first image data and the second image data, an operation unit through which data is input, and a communication unit that transmits data input by the second user through the operation unit to the first display device.

According to the present invention, a plurality of users can appropriately cooperate.

DESCRIPTION OF THE PREFERRED EMBODIMENTS

Figure 1:
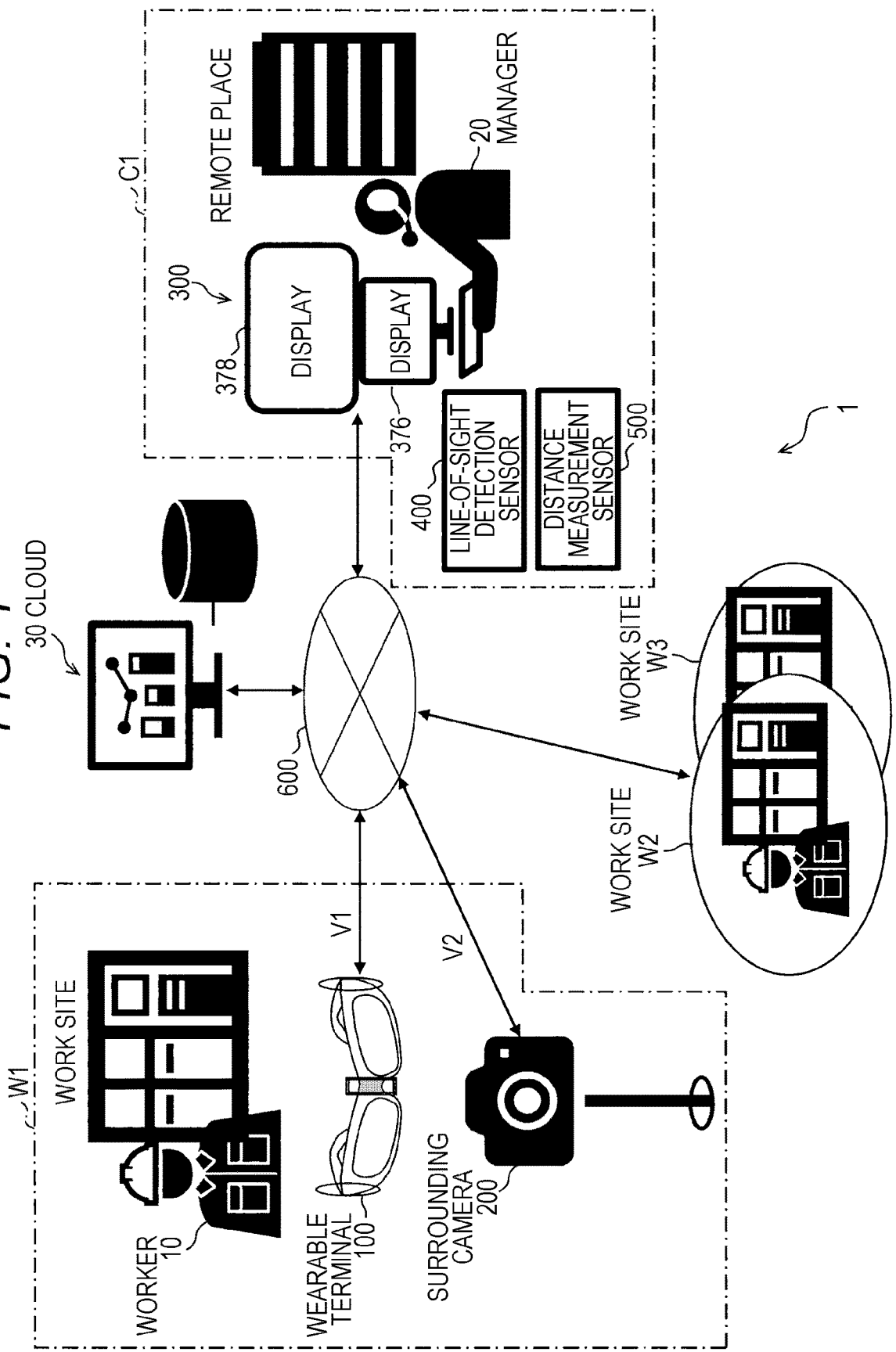
FIG. 1 is an overall configuration diagram of a remote work-support system according to an embodiment of the present invention.

<Configuration of Embodiment>
(Entire Configuration)

In the following embodiment, when necessary for the sake of convenience, the description will be made by dividing the description into a plurality of sections or embodiments; however, unless otherwise specified, the plurality of sections or embodiments are not unrelated to one another, and one is a modification, a detail, a supplementary explanation or the like of part or the entirety of the other.

Further, in the following embodiment, in the case of referring to the number (including the number, the numerical value, the amount, the range, and the like) and the like of elements, except a case where the number and the like are particularly specified, a case where the number and the like are clearly limited to a specific number in principle, and the like, the number and the like are not limited to the specific number, and may be equal to or more than or equal to or less than the specific number.

Furthermore, in the following embodiment, it is needless to say that the constituents (including the element steps, and the like) are not necessarily essential, except a case where the constituents are particularly specified, a case where it is clearly considered that the constituents are essential in principle, and the like.

Similarly, in the following embodiment, in the case of referring to the shapes, positional relationships, and the like of the constituents, the substantially approximate or similar shapes and the like are included, except where the shapes, positional relationships, and the like are clearly specified and the case where it is clearly considered that the substantially approximate or similar shapes and the like are not included in principle. This applies similarly to the above numerical value and range.

In all the drawings for describing the embodiment, identical members are denoted by identical reference numerals in principle, and the repeated description thereof will be omitted.

FIG. 1 is an overall configuration diagram of a remote work-support system 1 according to an embodiment of the present invention.

In FIG. 1, the remote work-support system 1 includes a wearable terminal 100, a surrounding camera 200, an information processing device 300, a line-of-sight detection sensor 400, and a distance measurement sensor 500 (posture detection unit). Here, a worker 10 (first user) who is at a work site W1 wears the wearable terminal 100 and performs various works. The wearable terminal 100 has a substantially eyeglass shape, and includes a transmission-type head mounted display (HMD), a camera, and the like (not illustrated). In particular, the camera mounted on the wearable terminal 100 captures an image from the viewpoint of the worker 10. The surrounding camera 200 is disposed near the worker 10.

A management center C1 (predetermined spot) is provided in a remote place away from the work site W1. A manager 20 (second user) who is an expert stays in the management center C1, and the information processing device 300, the line-of-sight detection sensor 400, and the distance measurement sensor 500 described above are set around the manager 20.

When the worker 10 arrives at the work site W1, the worker 10 wears the wearable terminal 100 (first display device) on the face and sets the surrounding camera 200 (surrounding imaging device) at any place. Here, the surrounding camera 200 is also called a spherical camera, a 360-degrees camera, or a 180-degree camera, and refers to a camera that captures 360-degrees panoramic and moving images in all of the up, down, left and right directions, and 180-degrees panoramic and moving images corresponding to a hemisphere. The surrounding camera 200 is portable, and is carried and set by the worker 10 every time the worker 10 moves to one work site to another work site. The set location of the surrounding camera 200 may be set, for example, close to the worker 10 so as to obtain a bird's eye of the worker 10 as if the manager 20 at the management center C1 is standing by the worker 10 and watching the work situation.

Note that similarly to the work site W1, also in other work sites W2 and W3, a worker 10, a wearable terminal 100, and a surrounding camera 200 are disposed (not illustrated), and the manager 20 can check the status of these work sites W1, W2, W3 via the information processing device 300. The wearable terminal 100, the surrounding camera 200, and the information processing device 300 can perform two-way communication via a communication network 600. Note that the communication network 600 may be any network such as a wide area network (WAN), a local area network (LAN), or a 4G (long term evolution (LTE))/5G.

For example, the information processing device 300 receives images supplied from the surrounding camera 200 and the wearable terminal 100, and displays the images on a plurality of (two in the illustrated example) displays 376, 378 (second display devices). By viewing these images, the manager 20 can simultaneously grasp the work situations of the workers 10 and the situations around the sites. Here, in order for the manager 20 to view the image with a high sense of reality, a small-medium display is preferably applied to the display 376 that displays the image from the wearable terminal 100. Further, a display larger than the display 376 is preferably applied to the display 378 that displays the image from the surrounding camera 200. In particular, the large display 378 is not limited to a flat panel display, and may be a spherical display or a semi-spherical display. In addition, it is preferable that the small-medium display 376 that outputs the image from the wearable terminal 100 is set in front of the manager 20 and the large display 378 is set behind the small-medium display 376 so that the manager 20 can intuitively determine which is the image from the wearable terminal 100 and which is the image from the surrounding camera 200.

The line-of-sight detection sensor 400 and the distance measurement sensor 500 in the management center C1 detect various types of movement of the manager 20. For example, the line-of-sight detection sensor 400 can detect which display is being viewed by the manager 20, and which part of the display is being viewed, and can acquire coordinates on the display. For this reason, the line-of-sight detection sensor 400 includes an infrared camera, a near-infrared camera, a visible light camera, a light source, and the like, and has a function of detecting the line-of-sight direction of the manager 20. The distance measurement sensor 500 is also called a three-dimensional sensor, and has a function of acquiring three-dimensional position information of the body, head, hands, arms, and the like of the manager 20 by using a time-of-flight (TOF) sensor, a stereo camera, or the like. The distance measurement sensor 500 detects movement of the body, head, hands, arms, and the like of the manager 20 by detecting the distance between the body, head, hands, arms, and the like of the manager 20 and the distance measurement sensor 500. Although details will be described later, the information processing device 300 allows the manager 20 detected by the distance measurement sensor 500 to scroll the image from the surrounding camera 200 displayed on the display in a non-contact manner on the basis of movement of the manager 20.

Cloud 30 includes a plurality of information processing devices such as a server device, and a storage. The cloud 30 is connected to the communication network 600 and stores images from the wearable terminal 100 and the surrounding camera 200, and also stores information on the workers 10 and the manager 20, and network configuration information of each of the work sites W1, W2, W3. In addition, the cloud 30 analyzes data of various sensors mounted on the wearable terminal 100 and various sensors set at the work site, converts the data into information valuable to the manager 20, and then transmits the information to the information processing device 300 of the manager 20. For example, the cloud 30 can analyze vital data of the worker 10 measured by a vital measurement unit 164 (see FIG. 2) mounted on the wearable terminal 100, can convert the fatigue or stress of the worker 10 into a numerical value, and can notify the manager 20 of the numerical value. Further, the cloud 30 manages and monitors the devices, terminals, and the like of the work sites W1, W2, W3, and notifies the manager 20 of an error when the error occurs.

As described above, according to the remote work-support system 1 illustrated in FIG. 1, the manager 20 can check the image from the viewpoint of the worker 10 via the small-medium display 376. Further, the manager 20 can operate and view the image around the site by himself/herself via the large display 378. Then, since the manager 20 can move his/her viewpoint as if the manager 20 were at the work site W1, the manager 20 can grasp the situation of the site including the worker 10 in detail.

(Wearable Terminal 100)

Figure 2:
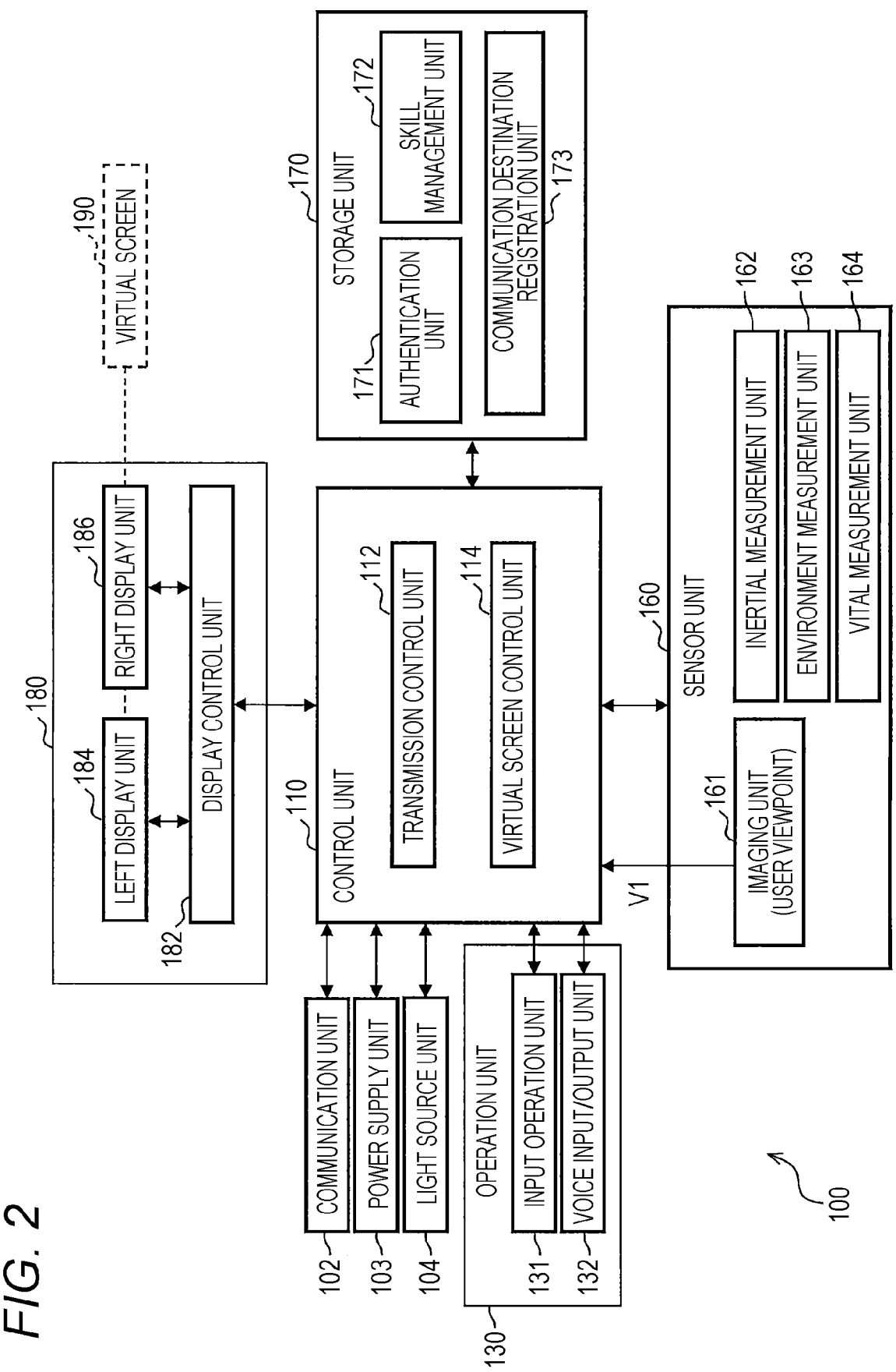
FIG. 2 is a block diagram illustrating an example of a configuration of a wearable terminal.

FIG. 2 is a block diagram illustrating an example of a configuration of the wearable terminal 100. Note that in the illustrated example, an operation function and an arithmetic processing function are integrated in the display device attached to the head part of the worker 10 (see FIG. 1).

In FIG. 2, the wearable terminal 100 includes a communication unit 102 (first communication unit), a power supply unit 103, a light source unit 104, a control unit 110, an operation unit 130, a sensor unit 160, a storage unit 170, and a display unit 180.

The communication unit 102 transmits and receives various data to and from the cloud 30, the information processing device 300, and the like via the communication network 600 (see FIG. 1) under control of the control unit 110. Further, the communication unit 102 also includes an interface of a short-range communication such as WiFi, Bluetooth (registered trademark), low-power wide area (LPWA), and a universal serial bus (USB). Thus, an additional input/output device (not illustrated) can be connected to the communication unit 102, and an operation command or the like can be input/output via the additional input/output device.

The power supply unit 103 includes a built-in or external battery or the like and supplies power to each unit of the wearable terminal 100. The light source unit 104 includes one or a plurality of light sources (not illustrated) that illuminates the area in front of and around the wearable terminal 100 in the case of using the sensor unit 160 or in a case where the surrounding environment is dark. In particular, in a case where the irradiation range of the light source is narrow, it is preferable to provide a plurality of light sources. Further, by setting the light source unit 104 at each of both ends of the wearable terminal 100, a wide irradiation range can be realized.

Here, the operation unit 130 includes an input operation unit 131 and a voice input/output unit 132. The input operation unit 131 includes an input device (not illustrated) such as a button, a touch panel, a switch, a dial, an external mouse, or a keyboard and a driver for controlling the device so that various data can be input by the worker 10 (see FIG. 1). The voice input/output unit 132 includes a microphone, an earphone, a speaker, and the like (not illustrated). The worker 10 can input voice data to the control unit 110 via the microphone, and the control unit 110 can output voice data to the worker 10 via the earphone, the speaker, or the like.

Further, the sensor unit 160 includes an imaging unit 161 (first imaging unit), an inertial measurement unit 162, an environment measurement unit 163, and a vital measurement unit 164. The imaging unit 161 sets the front of the worker 10, who is a user, that is, the field of view of the worker 10 as an imaging target, and captures a still image or a moving image with 4 k/8 k resolution and outputs image data V1 (first image data).

The inertial measurement unit 162 includes an acceleration sensor, a gyro sensor, a geomagnetic sensor, a global positioning system (GPS) device, and the like (not illustrated). Thus, the inertial measurement unit 162 acquires or estimates the line-of-sight direction, the line-of-sight position, the posture, the current position, and the like of the worker 10. The environment measurement unit 163 includes an illuminometer, a thermometer, a hygrometer, an environment microphone, and the like (not illustrated), and acquires or estimates information on the environment around the worker 10. Further, the environment measurement unit 163 generates a thermographic image 612 (see FIG. 20) on the basis of the measurement result of the thermometer or the like. The vital measurement unit 164 includes a heart rate monitor, a thermometer, a sphygmomanometer, a pulse meter, an electroencephalograph, and the like (not illustrated). Thus, the vital measurement unit 164 acquires physical information of the worker 10, and estimates the physical condition and emotion of the worker 10.

The storage unit 170 includes an authentication unit 171, a skill management unit 172, and a communication destination registration unit 173. More specifically, the storage unit 170 has a nonvolatile memory such as a ROM or a flash ROM (FROM), and stores various parameters, programs, and the like. The functions of the authentication unit 171, the skill management unit 172, the communication destination registration unit 173, and the like are realized by these parameters, programs, and the like.

When communication is performed between the wearable terminal 100 and the information processing device 300 or the cloud 30, the authentication unit 171 restricts access of personal authentication, device authentication, service authentication, and the like. The skill management unit 172 manages static information such as names, affiliations, occupations, work histories, years of experience, and qualifications of a plurality of users who can be the workers 10. The communication destination registration unit 173 manages address information and the like of terminals and services that communicate via the communication unit 102. For example, in the case of using the service of the cloud 30, a URL such as "http://(IP address of the cloud 30):(port number)/service ID" is set. Note that the storage unit 170 may be provided outside the wearable terminal 100. For example, the storage unit 170 may be provided in the cloud 30 connected via the network, and the wearable terminal 100 may access the storage unit 170 as necessary.

The display unit 180 includes a display control unit 182, a left display unit 184 (first display unit), and a right display unit 186 (first display unit). As described above, the wearable terminal 100 has a glasses-type configuration, and the left display unit 184 and the right display unit 186 are provided at positions corresponding to left and right eye glasses. The display control unit 182 controls the position and timing of the screens displayed on the left display unit 184 and the right display unit 186. As a result, the left display unit 184 and the right display unit 186 function as a transmissive HMD, and show a virtual screen 190 to the worker 10. Note that although one virtual screen 190 is illustrated in FIG. 2, the display unit 180 can show a plurality of virtual screens 190 to the worker 10.

The control unit 110 executes a control process, a real-time image process, and the like of the entire wearable terminal 100. The control unit 110 includes hardware as a general computer such as a central processing unit (CPU), a digital signal processor (DSP), a graphics processing unit (GPU), a random access memory (RAM), a read only memory (ROM), and the like. The ROM stores a control program executed by the CPU, a microprogram executed by the DSP, various data, and the like. In FIG. 2, inside the control unit 110, functions realized by a control program, a microprogram, and the like are illustrated as blocks.

That is, the control unit 110 includes a transmission control unit 112 and a virtual screen control unit 114 (screen control unit). Here, the transmission control unit 112 switches whether or not to transmit the image data V1 from the communication unit 102. In the case of transmitting the data, the transmission control unit 112 sets the data rate. Further, the virtual screen control unit 114 causes data supplied from the information processing device 300 (see FIG. 1) to be displayed on the virtual screen 190 via the display unit 180.

Note that the wearable terminal 100 does not have to be an eyeglass-type as long as the worker 10 can wear the wearable terminal 100. Further, the control unit 110 may be configured integrally with the sensor unit 160, the operation unit 130, and the like.

(Surrounding Camera 200)

Figure 3:
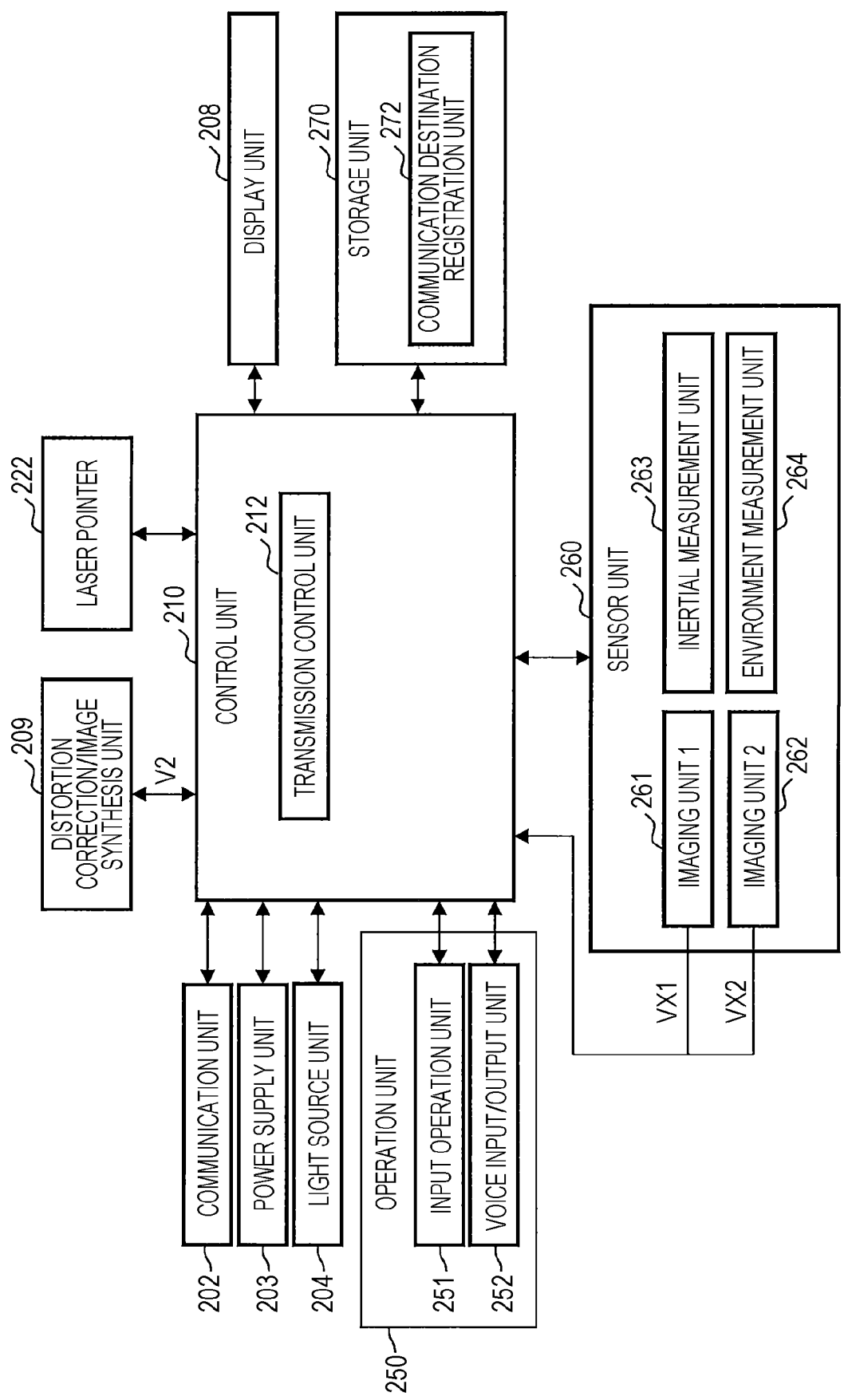
FIG. 3 is a block diagram illustrating an example of a configuration of a surrounding camera.

FIG. 3 is a block diagram illustrating an example of the configuration of the surrounding camera 200.

The surrounding camera 200 includes a communication unit 202 (second communication unit), a power supply unit 203, a light source unit 204, a display unit 208, a distortion correction/image synthesis unit 209 (second imaging unit), a control unit 210, an operation unit 250, a sensor unit 260, a storage unit 270, and a laser pointer 222 (direction display unit).

Here, the communication unit 202, the power supply unit 203, the light source unit 204, and the operation unit 250 are configured similarly to the communication unit 102, the power supply unit 103, the light source unit 104, and the operation unit 130 of the wearable terminal 100 (see FIG. 2), respectively.

The sensor unit 260 includes imaging units 261, 262 (second imaging unit), an inertial measurement unit 263, and an environment measurement unit 264. The imaging units 261, 262 include a wide-angle lens (not illustrated). The imaging units 261, 262 capture a high-resolution 360-degrees panoramic 4 k/8 k resolution still image or moving image of the entire circumference in the up, down, left and right directions, and output image data VX1 and VX2, respectively. In addition, the inertial measurement unit 263 and the environment measurement unit 264 are configured similarly to the inertial measurement unit 162 and the environment measurement unit 163 of the wearable terminal 100 (see FIG. 2).

The distortion correction/image synthesis unit 209 corrects distortion in a peripheral portion generated in the image data VX1 and VX2, combines the image data VX1 and VX2, and outputs a panoramic image data V2 (second image data) that is a still image or a moving image.

The laser pointer 222 emits a laser beam in a coordinate direction specified by the control unit 210 for the purpose of, for example, pointing a specific place to the worker 10. Note that, instead of the laser pointer 222, a plurality of light sources (for example, LEDs) may be disposed on a surface of a housing of the surrounding camera 200, and the light sources in the corresponding directions may be turned on.

The display unit 208 is, for example, a flat panel display, and displays various pieces of information under control of the control unit 210.

More specifically, the storage unit 270 has a nonvolatile memory such as a ROM or a flash ROM (FROM), and stores various parameters, programs, and the like. The storage unit 270 has a communication destination registration unit 272, the contents of which are similar to those of the communication destination registration unit 173 of the wearable terminal 100 (see FIG. 2) described above.

The control unit 210 includes hardware as a general computer, such as a CPU, a DSP, a GPU, a RAM, and a ROM. The ROM stores a control program executed by the CPU, a microprogram executed by the DSP, and various data, and the like. In FIG. 3, inside the control unit 210, functions realized by the control program, the microprogram, and the like are illustrated as blocks. That is, the control unit 210 includes a transmission control unit 212. Here, the transmission control unit 212 switches whether or not to transmit the panoramic image data V2 from the communication unit 202, and in the case of transmitting the panoramic image data V2, sets the data rate.

(Information Processing Device 300)

Figure 4:
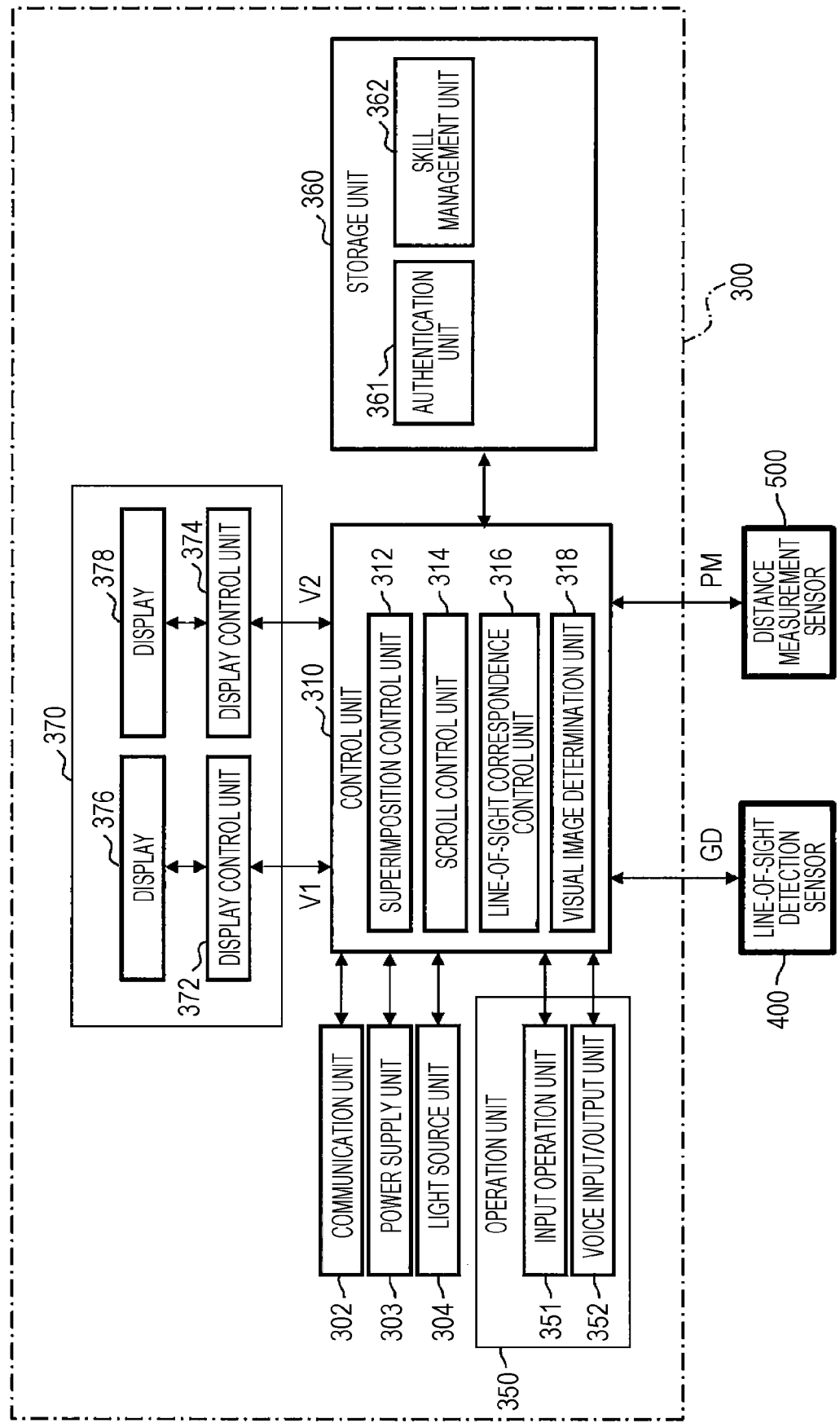
FIG. 4 is a block diagram illustrating an example of a configuration of an information processing device.

FIG. 4 is a block diagram illustrating an example of a configuration of the information processing device 300.

The information processing device 300 is, for example, a general personal computer or a server device, and includes a communication unit 302 (third communication unit), a power supply unit 303, a light source unit 304, a control unit 310, an operation unit 350, a storage unit 360, and a display unit 370. In addition, the control unit 310 is connected to a line-of-sight detection sensor 400 and a distance measurement sensor 500. The line-of-sight detection sensor 400 supplies data representing the line-of-sight detection direction of the manager 20 (see FIG. 1) to the control unit 310 as line-of-sight direction data GD. Further, the distance measurement sensor 500 supplies the posture and the movement of the manager 20 to the control unit 310 as posture/movement data PM.

Here, the communication unit 302, the power supply unit 303, the light source unit 304, and the operation unit 350 are configured similarly to the communication unit 102, the power supply unit 103, the light source unit 104, and the operation unit 130 of the wearable terminal 100 (see FIG. 2).

The display unit 370 includes the above-described displays 376, 378, and display control units 372, 374 that control the displays 376, 378.

The storage unit 360 has a nonvolatile memory such as a ROM or a flash ROM (FROM), and stores various parameters, programs, and the like. The storage unit 360 includes an authentication unit 361 and a skill management unit 362, and the contents thereof are similar to those of the authentication unit 171 and the skill management unit 172 of the wearable terminal 100 (see FIG. 2) described above.

The control unit 310 includes hardware as a general computer, such as a CPU, a RAM, a ROM, a GPU, and an SSD. The SSD stores an operating system (OS), an application program, various data, and the like. The OS and application programs are loaded on the RAM and executed by the CPU. In FIG. 4, inside the control unit 310, functions realized by the application program and the like are illustrated as blocks.

That is, the control unit 310 includes a superimposition control unit 312, a scroll control unit 314, a line-of-sight correspondence control unit 316, and a visual image determination unit 318. As a result, the control unit 310 outputs images and information received from the wearable terminal 100, the surrounding camera 200, the cloud 30, and the like to the display unit 370.

The superimposition control unit 312 superimposes other information on the image data V1 and the panoramic image data V2 as necessary. The scroll control unit 314 scrolls the panoramic image data V2 displayed on the large display 378 in the vertical or horizontal direction on the basis of the line-of-sight direction data GD or the posture/movement data PM. Further, the visual image determination unit 318 determines which of the image data V1 and the panoramic image data V2 the manager 20 is viewing on the basis of the line-of-sight direction data GD, and detects the coordinate position at which the manager 20 is viewing.

In addition, the line-of-sight correspondence control unit 316 determines whether or not the manager 20 is in a predetermined posture (for example, a slouching posture) on the basis of the posture/movement data PM. Then, in a case where the manager 20 is in a predetermined posture and focuses his or her eyes on a substantially constant coordinate position for a predetermined time or more, the line-of-sight correspondence control unit 316 enlarges and displays the surrounding range of the coordinate position in the image data V1 or the panoramic image data V2.

<Operation of Embodiment>
(Work Start Procedure)

Figure 5:
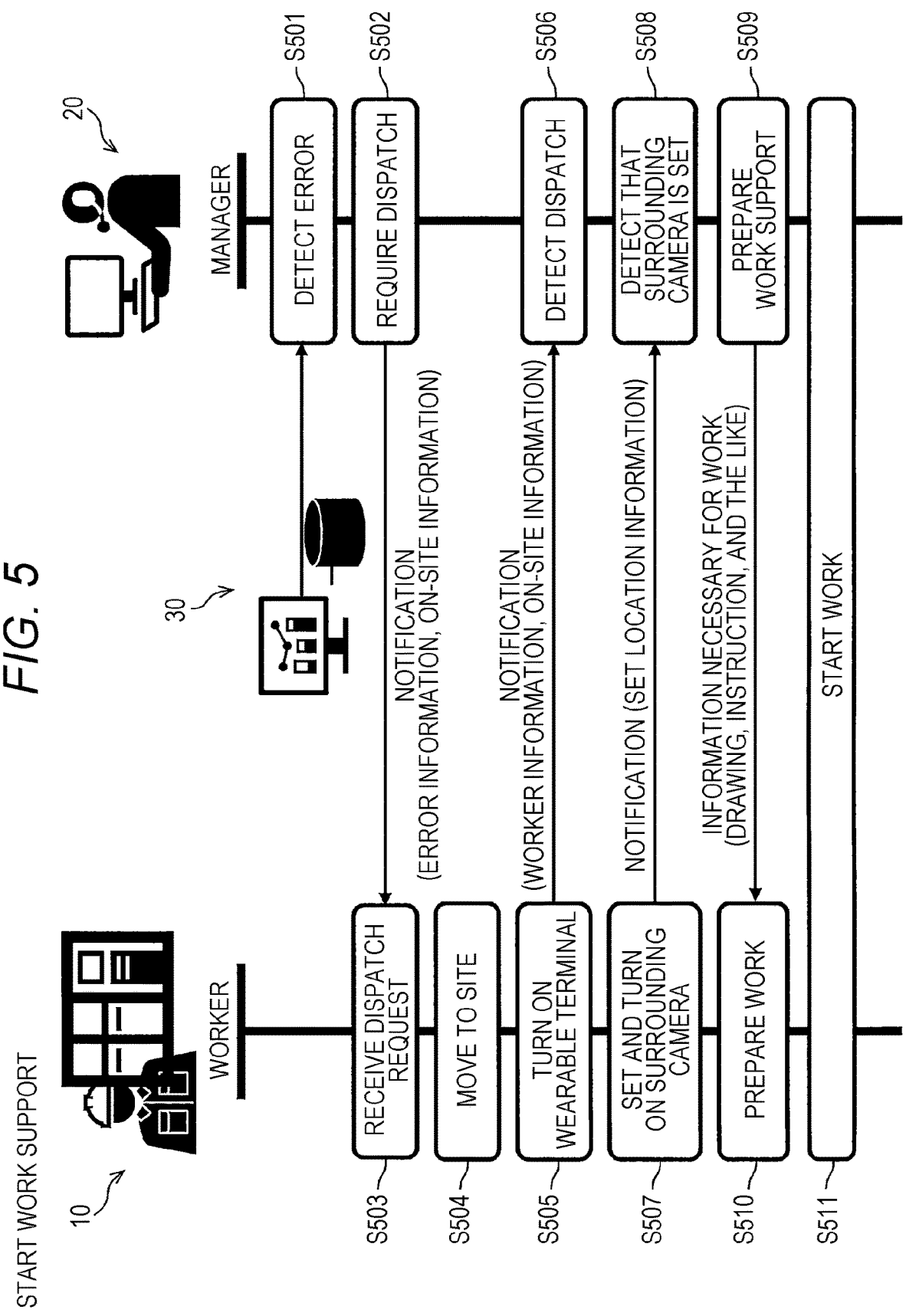
FIG. 5 is a sequence diagram illustrating an example of a work start procedure.

FIG. 5 is a sequence diagram illustrating an example of a work start procedure. FIGS. 6A to 6D are views illustrating various screens to be displayed on the displays 376 and 378 in the work start procedure.

In FIG. 5, when the cloud 30 detects the occurrence of an error in any of the devices and terminals managed and monitored, the information processing device 300 notifies the manager 20 of an error via the display unit 370 (step S501). For example, the information processing device 300 displays an error screen 601 illustrated in FIG. 6A on the small-medium display 376.

It is assumed that the manager 20 checks the details of the error generated by operating the error screen 601 and determines that it is necessary to dispatch a worker to the site where the error has occurred as a countermeasure. Then, the manager 20 transmits a dispatch request to a mobile terminal of any worker 10 (step S502). At this time, the details of the error and information on the site where the error has occurred are preferably transmitted to the worker 10. The worker 10 receives the dispatch request (step S503), and checks the details of the error and the information of the site where the error has occurred. Next, the worker 10 carries the wearable terminal 100 and the surrounding camera 200 (see FIG. 1) and moves to the site where the error has occurred (step S504). Here, it is assumed that the site where the error has occurred is, for example, the work site W1 illustrated in FIG. 1.

When the worker 10 arrives at the site where the error has occurred, that is, the work site W1, the worker 10 wears the wearable terminal 100 and operates the power supply unit 103 (see FIG. 2) to turn the power supply unit 103 ON (step S505). The powered-on wearable terminal 100 acquires user information (information on the user) stored in the skill management unit 172 (see FIG. 2). Further, the wearable terminal 100 acquires current position information from the inertial measurement unit 162. Next, the control unit 110 of the wearable terminal 100 acquires address information of the cloud 30 stored in the communication destination registration unit 173 and the address information of the information processing device 300 managed by the manager 20, and accesses the information processing device 300 via the communication unit 102. Then, the wearable terminal 100 transmits the acquired user information and current position information, and starts live streaming distribution of image data V1 captured by the imaging unit 161.

Figure 6C:
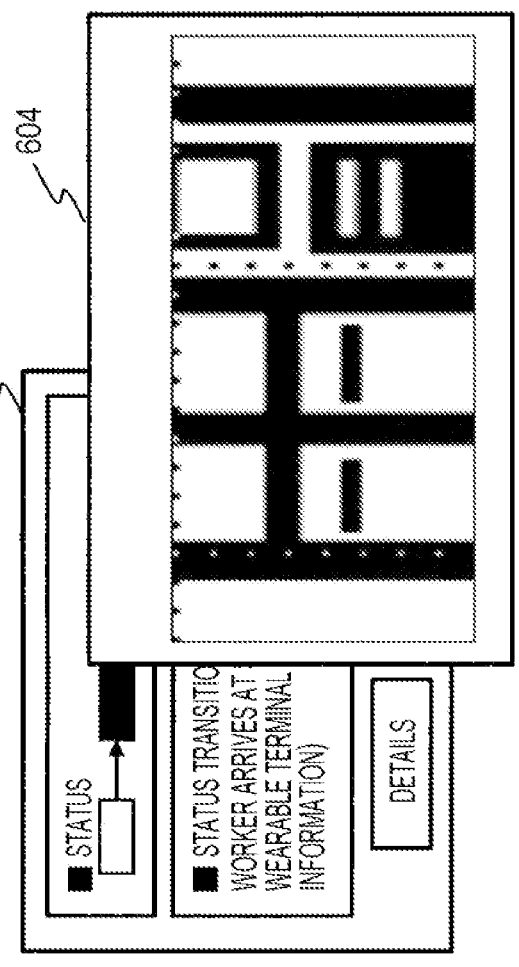
FIGS. 6A to 6D are views illustrating various screens to be displayed on a display in the work start procedure.

In contrast, the manager 20 detects dispatch of the worker 10 by receiving a notification or an image from the wearable terminal 100 via the information processing device 300 (step S506). At this time, for example, screens 603, 604 illustrated in FIG. 6C are displayed on the small-medium display 376. Next, the worker 10 sets the surrounding camera 200 at any place on the work site W1, and operates the power supply unit 203 (see FIG. 3) to turn the power supply unit 203 ON (step S507). The surrounding camera 200 whose power is turned ON acquires the current position from the inertial measurement unit 263 (see FIG. 3). The control unit 210 of the surrounding camera 200 acquires the address information of the cloud 30 stored in the communication destination registration unit 272 and the address information of the information processing device 300 managed by the manager 20, and accesses the information processing device 300 via the communication unit 202.

Figure 6D:
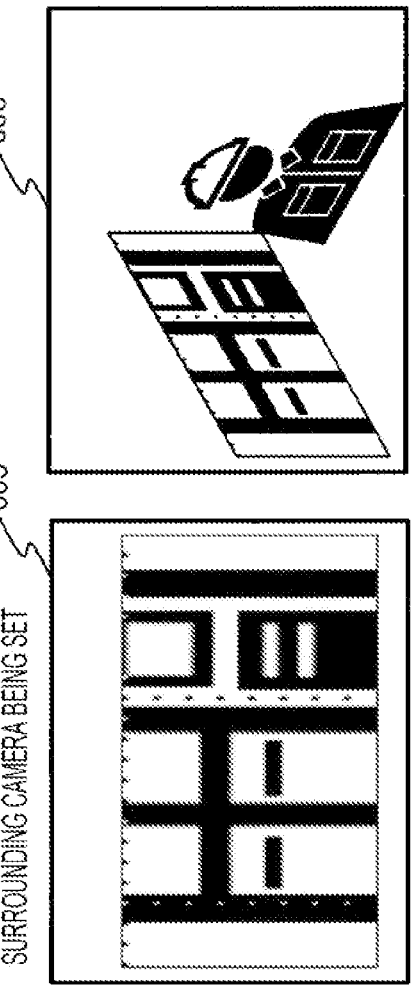
Figure 6A:
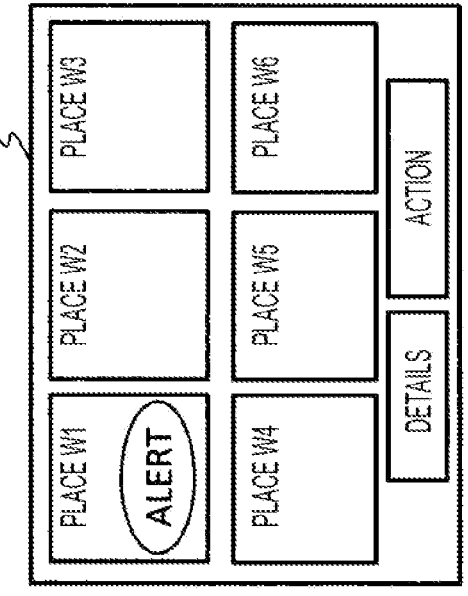
Figure 6B:
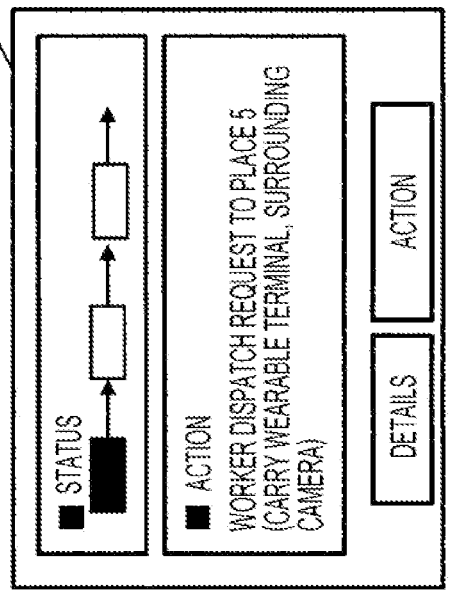

Then, the surrounding camera 200 transmits the acquired current position information and starts live streaming distribution of panoramic image data V2. The information processing device 300 displays such information via the large display 378 (see FIG. 4). As a result, the manager 20 visually recognizes the notification and the image from the surrounding camera 200 via the display 378, and detects that the surrounding camera 200 is set (step S508). At this time, for example, one of the screens 605, 606 illustrated in FIG. 6D is displayed on the display 378 on the basis of the panoramic image data V2.

Next, the manager 20 prepares a procedure manual and drawings to be executed by the worker 10 and transmits the procedure manual and drawings to the wearable terminal 100 of the worker 10 (step S509). At this time, the manager 20 may input the execution contents by voice via the voice input/output unit 352 of the information processing device 300, and may adopt the procedure manual obtained by converting the voice contents into text. The wearable terminal 100 that has received the procedure manual and the drawings displays the procedure manual and the drawings on a virtual screen 190 generated by the display unit 180 (see FIG. 2).

The worker 10 checks the contents of the displayed procedure manual and drawings, and performs necessary work preparations (step S510). Next, when the worker 10 uses the voice input/output unit 132 to input a voice saying "start work", the content is transmitted to the information processing device 300 via the communication unit 102, and are displayed on the displays 376, 378 (see FIG. 4). The manager 20 starts work support for the worker 10 while watching the images displayed on the displays 376, 378 (step S511).

(Partial Enlarge Display Operation)

Figure 7:
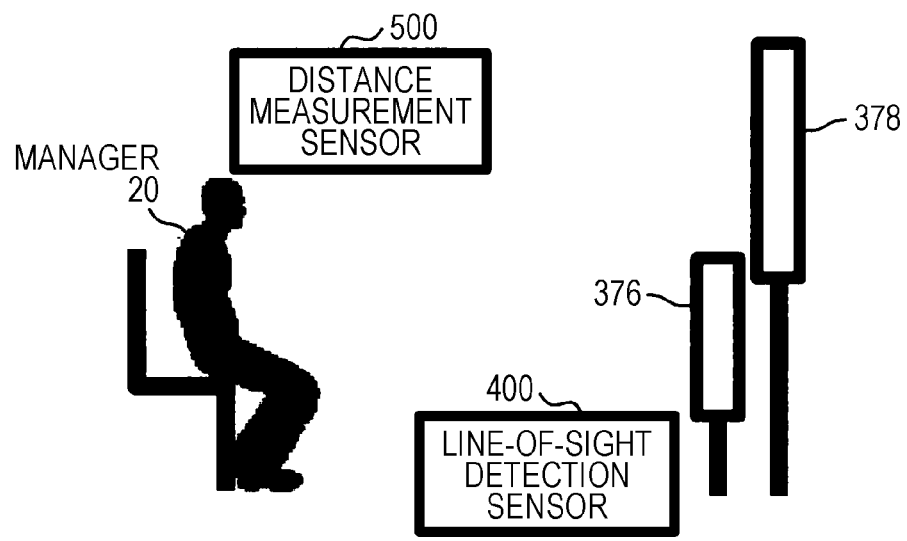
FIG. 7 is a schematic view illustrating an environment in which a manager performs work-support.

FIG. 7 is a schematic view illustrating an environment in which the manager 20 performs work-support. In the illustrated example, the small-medium display 376 is disposed below the large display 378. Then, as described above, the display 378 displays the panoramic image data V2 and the like from the surrounding camera 200, and the display 376 displays the image data V1 and the like from the wearable terminal 100. The manager 20 can grasp the state of the work site W1 while watching the images on the displays 376, 378.

The line-of-sight detection sensor 400 is set below the displays 376, 378, and the distance measurement sensor 500 is set beside or above the manager 20. Here, a plurality of the line-of-sight detection sensors 400 may be set. For example, the plurality of line-of-sight direction sensors 400 may be set below the display 376 and below the display 378. Similarly, a plurality of distance measurement sensors 500 may be set. For example, the distance measurement sensor 500 may be set on each of the side and above the manager 20, respectively.

Figure 8:
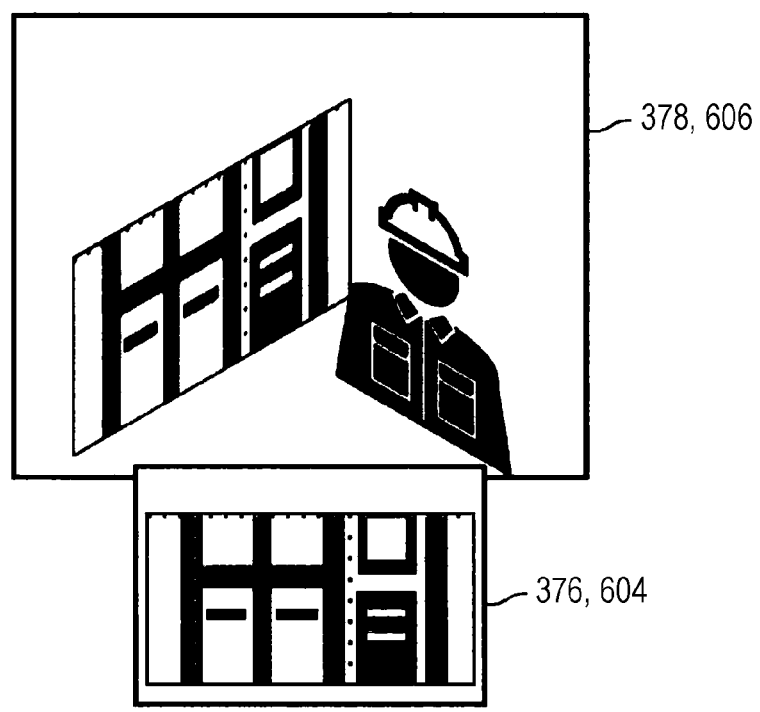
FIG. 8 is a view illustrating a display example of two displays.

FIG. 8 is a view illustrating a display example of the two displays 376, 378. In the illustrated example, the screen 606 illustrated in FIG. 6D is displayed on the large display 378 on the basis of the panoramic image data V2. Further, a screen 604 illustrated in FIG. 6C is displayed on the small-medium display 376 on the basis of the image data V1.

Figure 9:
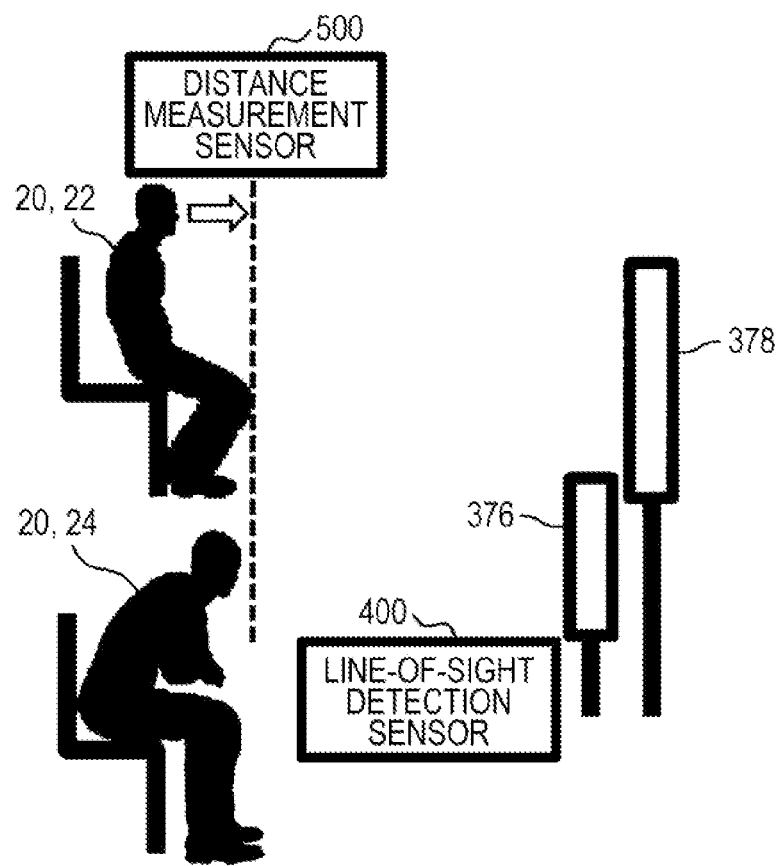
FIG. 9 is an explanatory view of enlarged display operation.

FIG. 9 is an explanatory view of enlarged display operation.

A posture 22 illustrated in FIG. 9 is a normal posture of the manager 20. A posture 24 is a posture of the manager 20 looking into the displays 376 and 378 with a slouch. When the manager 20 views the images on the displays 376, 378 in the posture 22, the manager 20 wishes to see a specific portion of the image in detail in some cases. In that case, the manager 20 takes the posture 24 of looking into a specific part with a slouch. Then, the distance measurement sensor 500 detects the posture 24, and outputs posture/movement data PM indicating that the posture 24 is detected to the control unit 310 (see FIG. 4) of the information processing device 300.

Next, the visual image determination unit 318 determines which of the image data V1 and the panoramic image data V2 the manager 20 views on the basis of the line-of-sight direction data GD, and detects the coordinate position at which the manager 20 is viewing. As a result, the line-of-sight correspondence control unit 316 enlarges and displays the surrounding range of the coordinate position in the image data V1 or the panoramic image data V2. Here, when the posture of the manager 20 returns to the original posture 22 (see FIG. 9), the distance measurement sensor 500 detects the posture, and outputs the posture/movement data PM indicating that the posture is returned to the original posture 22 to the control unit 310 of the information processing device 300. In contrast, the control unit 310 returns the display state of the image data V1 or the panoramic image data V2 to the original state (see FIG. 8).

Figure 10:
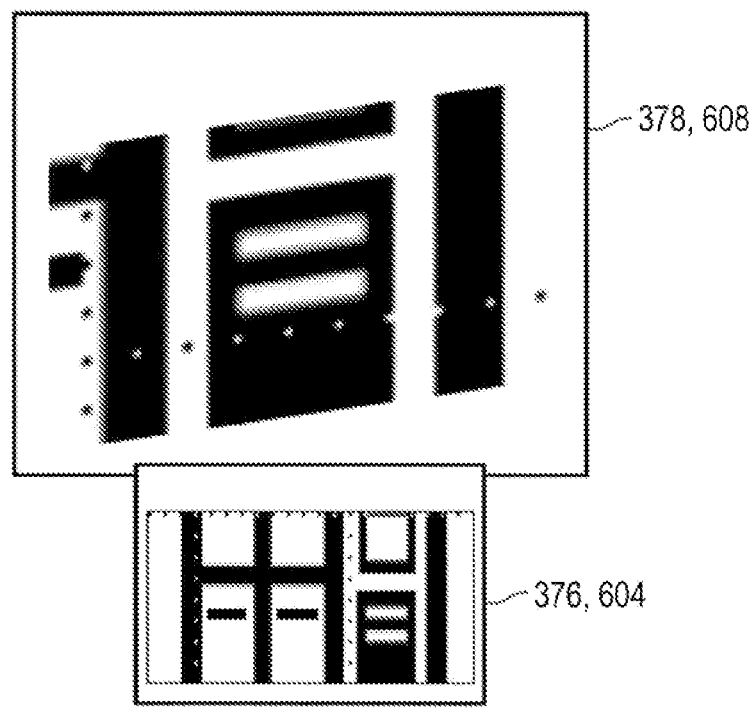
FIG. 10 is a view illustrating another display example of two displays.

FIG. 10 is a view illustrating another display example of the two displays 376, 378. As an example, it is assumed that the screens 604, 606 illustrated in FIG. 8 are displayed on the displays 376, 378. Then, it is assumed that the manager 20 focuses his or her eyes on the vicinity of the center of the screen 606 in the posture 24 (see FIG. 9) of looking into the vicinity with a slouch. Then, as illustrated in FIG. 10, a screen 608 in which the vicinity of the center of the screen 606 is enlarged is displayed on the display 378. Note that the screen 604 similar to that of FIG. 8 is displayed on the display 376. As described above, the image can be enlarged and reduced by natural operation of the manager 20.

(Scroll Operation #1)

Figure 11:
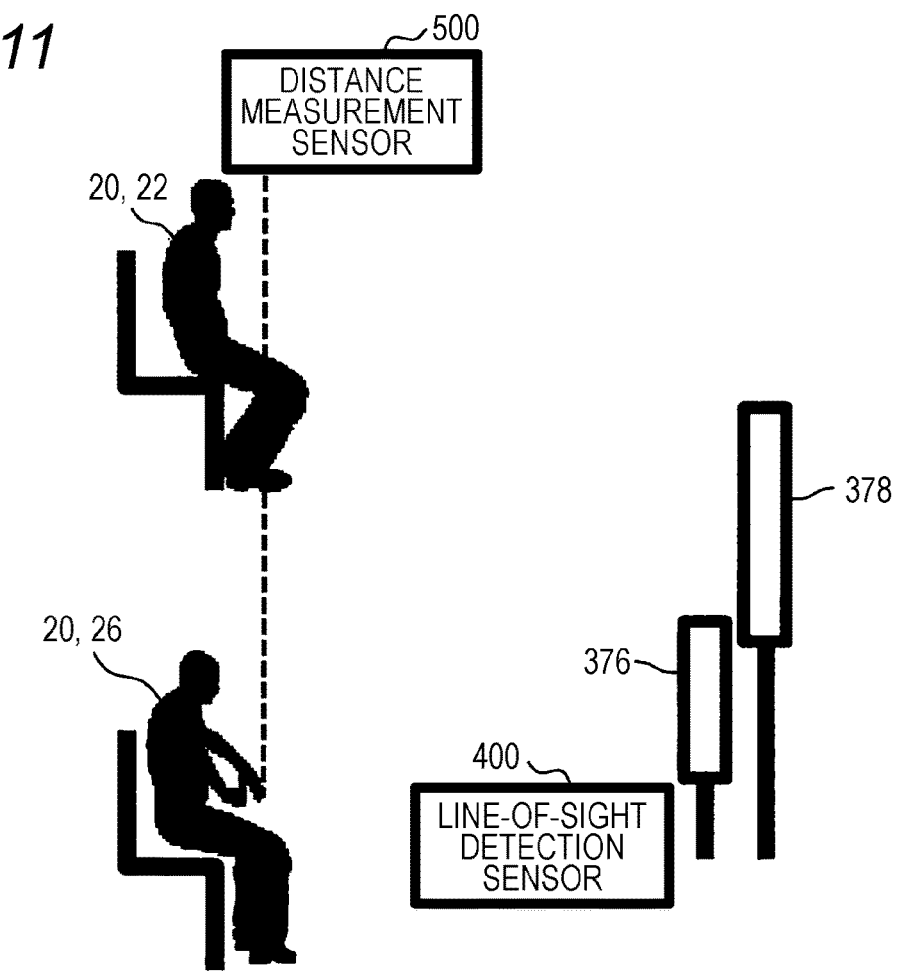
FIG. 11 is an explanatory view of scroll operation.

FIG. 11 is an explanatory view of scroll operation.

The illustrated posture 22 is similar to the posture of the manager 20 illustrated in FIG. 7. Here, the manager 20 wishes to scroll the panoramic image data V2 displayed on the large display 378 in some cases. In such a case, as the posture 26 indicates, the manager 20 performs movement of swinging the hand or the arm in a scroll direction. The distance measurement sensor 500 detects this movement and supplies corresponding posture/movement data PM to the control unit 310 of the information processing device 300. Then, the scroll control unit 314 (see FIG. 4) in the control unit 310 scrolls the panoramic image data V2 in the direction in which the manager 20 is swinging his or her hand on the basis of the posture/movement data PM. Note that the direction in which the panoramic image data V2 is scrolled is, for example, the horizontal direction or the vertical direction.

Figure 12:
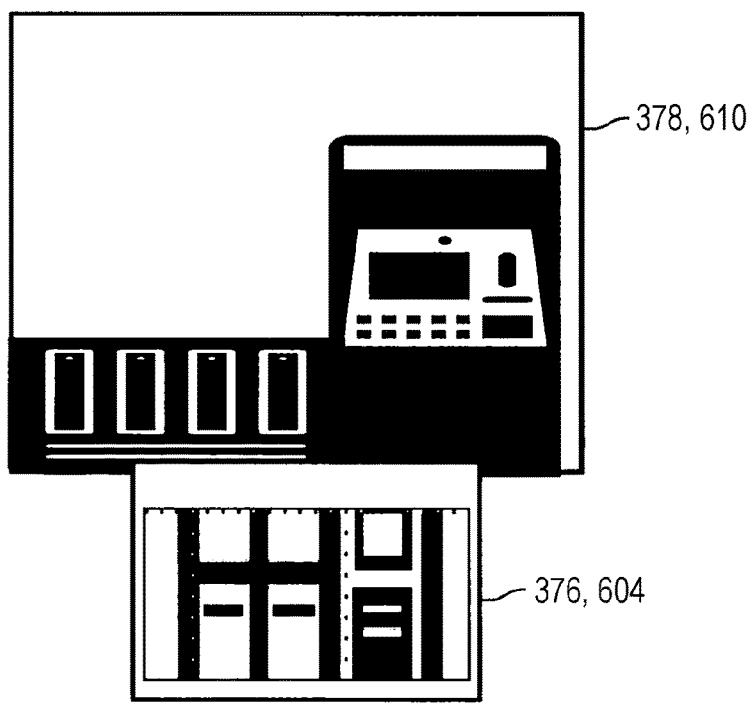
FIG. 12 is a view illustrating another display example of two displays.

FIG. 12 is a view illustrating another display example of the two displays 376, 378. As an example, it is assumed that the screens 604, 606 illustrated in FIG. 8 are displayed on the displays 376, 378. Then, as the posture 26 illustrated in FIG. 11 indicates, it is assumed that the manager 20 performs movement of swinging the hand or the arm in the scroll direction. Then, as illustrated in FIG. 12, a screen 610 obtained by scrolling the screen 606 (see FIG. 8) is displayed on the display 378. Note that the screen 604 similar to that of FIG. 8 is displayed on the display 376.

(Scroll Operation #2)

Further, another method can be adopted to scroll the panoramic image data V2 on the display 378. That is, "the manager 20 moves the line of sight at a predetermined speed in the direction in which the manager 20 wishes to scroll". The line-of-sight detection sensor 400 supplies line-of-sight direction data GD representing movement of the line-of-sight of the manager 20 to the control unit 310 (see FIG. 4) of the information processing device 300. Then, the scroll control unit 314 scrolls the panoramic image data V2 in the direction in which the line of sight has moved on the basis of the line-of-sight direction data GD. As described above, the panoramic image data V2 can be scrolled in a non-contact manner by natural movement of the manager 20.

(Information Transmission to Worker 10)

Figure 13:
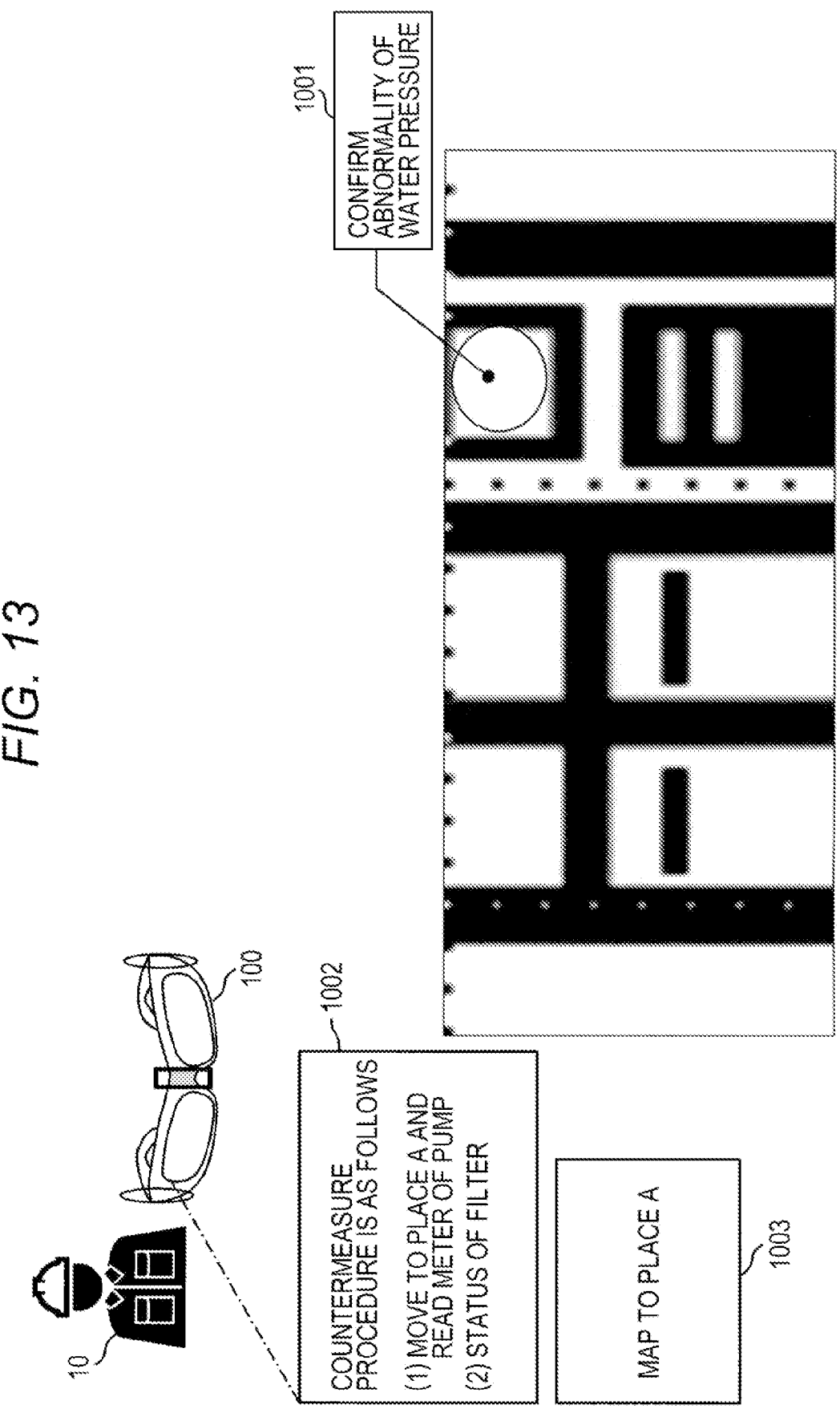
FIG. 13 is a view illustrating an example of various virtual screens.

FIG. 13 is a view illustrating an example of various virtual screens.

The manager 20 can operate the operation unit 350 (see FIG. 4) of the information processing device 300 to transmit various types of information to the wearable terminal 100. As a result, for example, virtual screens 1001 to 1003 as illustrated in FIG. 13 are displayed on the wearable terminal 100. The virtual screen 1001 indicates the cause of the error specified by the manager 20. The virtual screen 1002 displays a task specified by the manager 20 and to be executed next by the worker 10. The virtual screen 1003 shows a map of the destination.

(Resolution Reduction Process)

In FIG. 1, image data V1 and panoramic image data V2 supplied to the information processing device 300 via the communication network 600 are usually high-resolution data. However, if a failure occurs in the communication network 600 or the like and the communication state deteriorates, when the high-resolution image data V1 and the panoramic image data V2 are transferred, the image may be interrupted. Therefore, in the present embodiment, the process of reducing the resolution of either the image data V1 or the panoramic image data V2, that is, the process of reducing the data rate, is performed.

Figure 14:
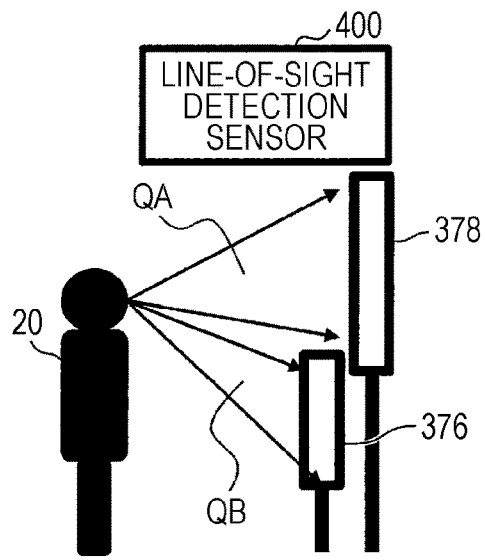
FIG. 14 is a schematic view illustrating an environment in which a resolution reduction process is performed.

FIG. 14 is a schematic view illustrating an environment in which a resolution reduction process is performed.

In FIG. 14, when the manager 20 views the large display 378, the range of the line of sight is referred to as an "area QA". When the manager 20 views the small-medium display 376, the range of the line of sight is referred to as an "area QB". It is assumed that the image data V1 is displayed on the display 376, and the panoramic image data V2 is displayed on the display 378. The visual image determination unit 318 (see FIG. 4) determines which of the areas QA and QB the line-of-sight direction of the manager 20 belongs to on the basis of the line-of-sight direction data GD of the line-of-sight detection sensor 400.

Figure 15:
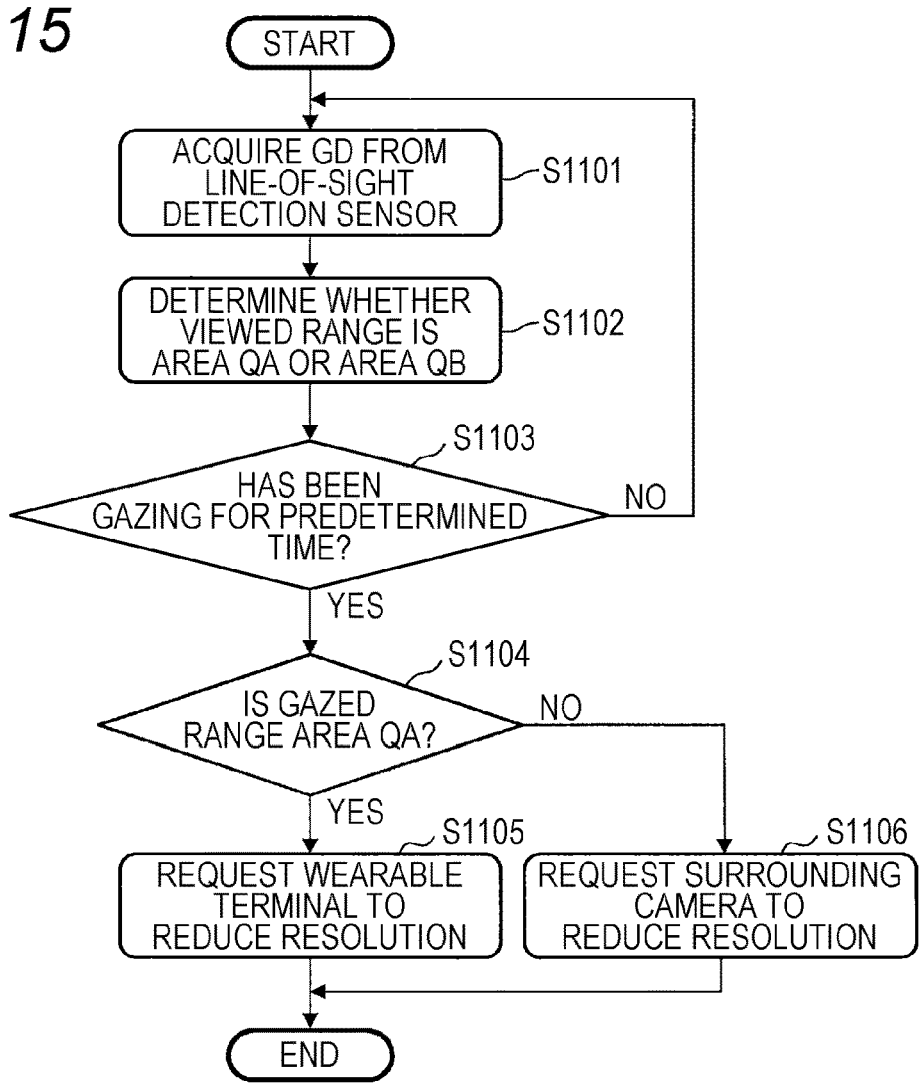
FIG. 15 is a flowchart of a resolution reduction process routine.

FIG. 15 is a flowchart of a resolution reduction process routine executed in the control unit 310.

In FIG. 15, if the process proceeds to step S1101, the visual image determination unit 318 (see FIG. 4) acquires the line-of-sight direction data GD from the line-of-sight detection sensor 400. Next, if the process proceeds to step S1102, the visual image determination unit 318 determines which of the areas QA and QB the range viewed by the manager 20 is. Next, if the process proceeds to step S1103, the visual image determination unit 318 determines whether or not the manager 20 has been gazing at one of the areas QA and QB for a predetermined time (whether or not the line-of-sight position remains unchanged).

If it is determined to be "No" in step S1103, the process returns to step S1101, and the above-described operation is repeated. In contrast, if it is determined to be "Yes" in step S1103, the process proceeds to step S1104, and the visual image determination unit 318 determines whether the gazed range is the area QA (that is, the panoramic image data V2). Here, if it is determined to be "Yes", the process proceeds to step S1105. In step S1105, the visual image determination unit 318 transmits a signal requesting resolution reduction to the wearable terminal 100.

If the wearable terminal 100 receives this signal, the transmission control unit 112 (see FIG. 2) of the wearable terminal 100 lowers the data rate of the image data V1 to reduce the resolution. For example, the original resolution of "4 k/30 fps" is reduced to "Hi-Vision/15 fps". As a result, thereafter, the image data V1 with reduced resolution is displayed on the small-medium display 376. In contrast, in a case where the gazed range is the area QB (that is, the image data V1), it is determined to be "No" in step S1104, and the process proceeds to step S1106.

In step S1106, the visual image determination unit 318 transmits a signal requesting resolution reduction to the surrounding camera 200. If the surrounding camera 200 receives this signal, the transmission control unit 212 of the surrounding camera 200 lowers the data rate of the panoramic image data V2 to reduce the resolution. As a result, the panoramic image data V2 with reduced resolution is displayed on the large display 378 thereafter.

As described above, according to the present embodiment, out of the image data V1 and the panoramic image data V2, the image being gazed by the manager 20 is maintained in a high image quality state, and the image not being gazed by the manager 20 is reduced in image quality. As a result, the amount of data on the communication network 600 can be reduced. Note that the communication environment is further deteriorated, the transmission control units 112, 212 may stop transmitting the image data V1 or the panoramic image data V2.

(Focused-on Spot Notification Process #1)

Next, a process in which the worker 10 at the work site W1 is notified of a focused-on spot of the manager 20 will be described.

Figure 16:
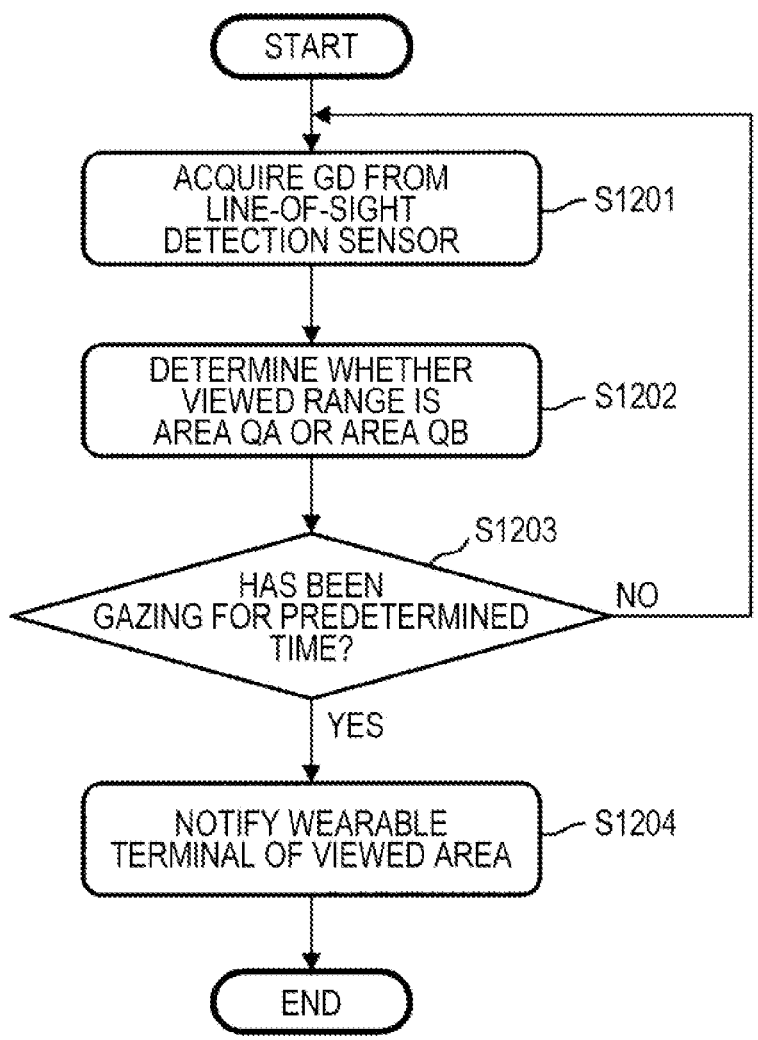
FIG. 16 is a flowchart of a focused-on spot notification routine.

FIG. 16 is a flowchart of a focused-on spot notification routine. In FIG. 16, the processes in steps S1201, S1202, S1203 are similar to those in steps S1101, S1102, S1103 in FIG. 15. That is, the case where it is determined to be "Yes" in step S1203 is a case where the manager 20 has been gazed at one of the areas QA and QB for a predetermined time. If it is determined to be "Yes" in step S1203, the process proceeds to step S1204, and notifies the wearable terminal 100 of the range that the manager 20 is looking at. Thus, the process of this routine ends.

Figure 17:
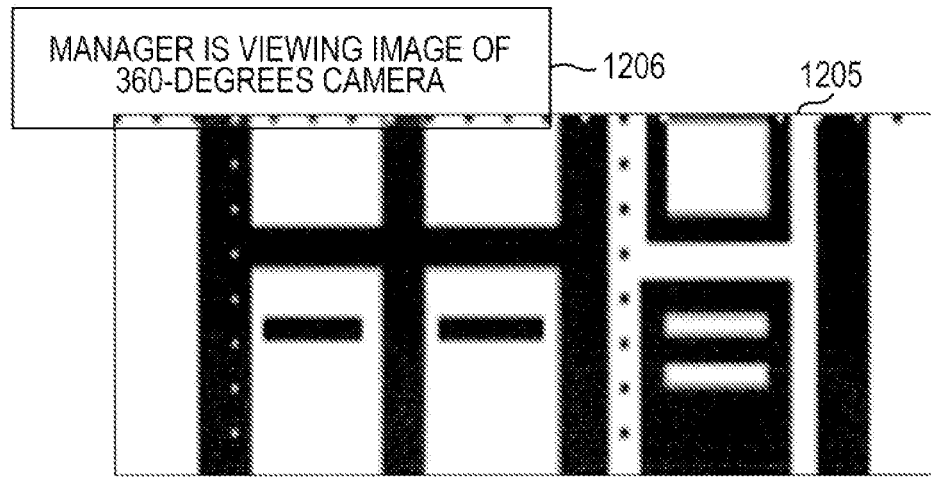
FIG. 17 is a view illustrating another example of the various virtual screens.

FIG. 17 is a view illustrating an example of various virtual screens.

If the wearable terminal 100 receives the notification in step S1204 described above, the wearable terminal 100 displays, for example, virtual screens 1205, 1206 as illustrated in FIG. 17.

This allows the worker 10 to grasp which of the image of the image data V1 or the image of the panoramic image data V2 the manager 20 focuses his or her eyes on. Therefore, the worker 10 is more likely to notice an error or a situation change.

(Focused-on Notification Process #2)

Figure 18:
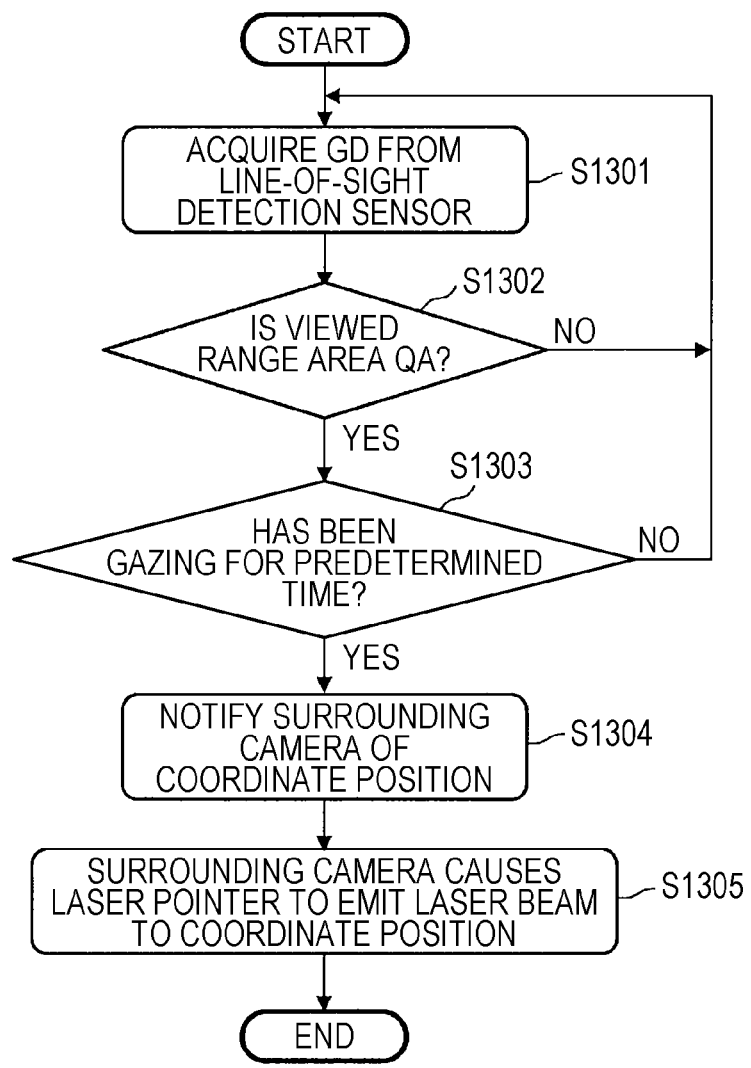
FIG. 18 is a flowchart of a detailed focused-on spot notification routine.

FIG. 18 is a flowchart of a detailed focused-on notification routine.

This routine allows the worker 10 to grasp the more detailed line-of-sight direction in a case where the manager 20 focuses his or her eyes on the panoramic image data V2. In FIG. 18, if the process proceeds to step S1301, the visual image determination unit 318 (see FIG. 4) acquires the line-of-sight direction data GD from the line-of-sight detection sensor 400. Next, if the process proceeds to step S1302, the visual image determination unit 318 determines whether or not the range viewed by the manager 20 is the area QA. If it is determined to be "No", the process returns to step S1301.

In contrast, if it is determined to be "Yes" in step S1302, the process proceeds to step S1303. Here, the visual image determination unit 318 determines whether or not the manager 20 has been gazing at the area QA for a predetermined time. If it is determined to be "No" here, the process returns to step S1301. In contrast, if it is determined to be "Yes", the process proceeds to step S1304, and the visual image determination unit 318 notifies the surrounding camera 200 of the coordinate position in the line-of-sight direction. That is, the visual image determination unit 318 determines which position of the panoramic image data V2 that is the 360-degrees panoramic image the line-of-sight position of the manager 20 corresponds to, and notifies the surrounding camera 200 of the coordinate position. Thus, the process of this routine ends.

In contrast, upon receiving the coordinate position described above, the control unit 210 (see FIG. 3) of the surrounding camera 200 controls a laser pointer 222 so as to emit a laser beam to the coordinate position.

Figure 19:
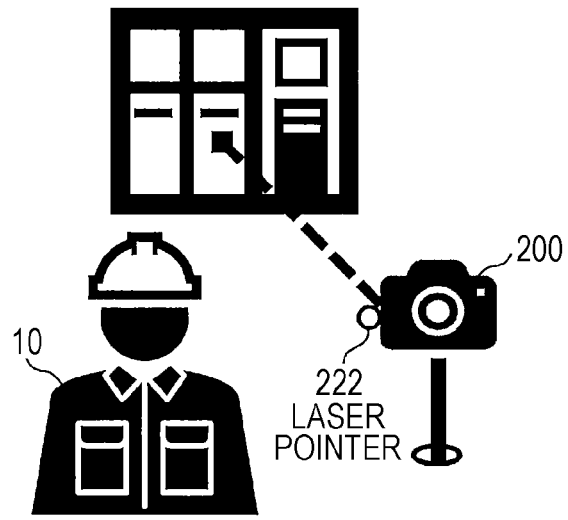
FIG. 19 is a schematic view illustrating focused-on spot notifying operation using a laser pointer.

FIG. 19 is a schematic view illustrating a focused-on spot notifying operation by the laser pointer 222. As illustrated in FIG. 19, the laser pointer 222 emits a laser beam to a focused-on point of the manager 20, so that the worker 10 can easily grasp the focused-on point of the manager 20. As a result, the worker 10 can more easily notice an error or a change in the situation, and can accurately grasp the part that the manager 20 is gazing at as a work target.

Note that in the above-described process, the focused-on point of the manager 20 is displayed by the laser pointer 222; however, the focused-on point may be notified in the wearable terminal 100. That is, an image portion that the manager 20 is gazing at on the large display 378 may be cut out, the cut-out image portion may be transmitted to the wearable terminal 100, and may be displayed on the display unit 180.

(Thermographic Display Process)

As described above, the environment measurement unit 163 (see FIG. 2) of the wearable terminal 100 generates a thermographic image of a target in the field of view of the imaging unit 161. It is assumed that the manager 20 views the image data V1 from the wearable terminal 100 on the small-medium display 376 (see FIG. 4). Here, if the manager 20 performs a predetermined operation for specifying "thermographic display" on the operation unit 350, the wearable terminal 100 is notified of the fact via the communication unit 302.

Then, thereafter, the wearable terminal 100 transmits a thermographic image to the information processing device 300 together with the image data V1. When the information processing device 300 receives the image data V1 and the thermographic image, the superimposition control unit 312 superimposes the image data V1 and the thermographic image and causes the display 376 to display the image data V1 and the thermographic image.

Figure 20:
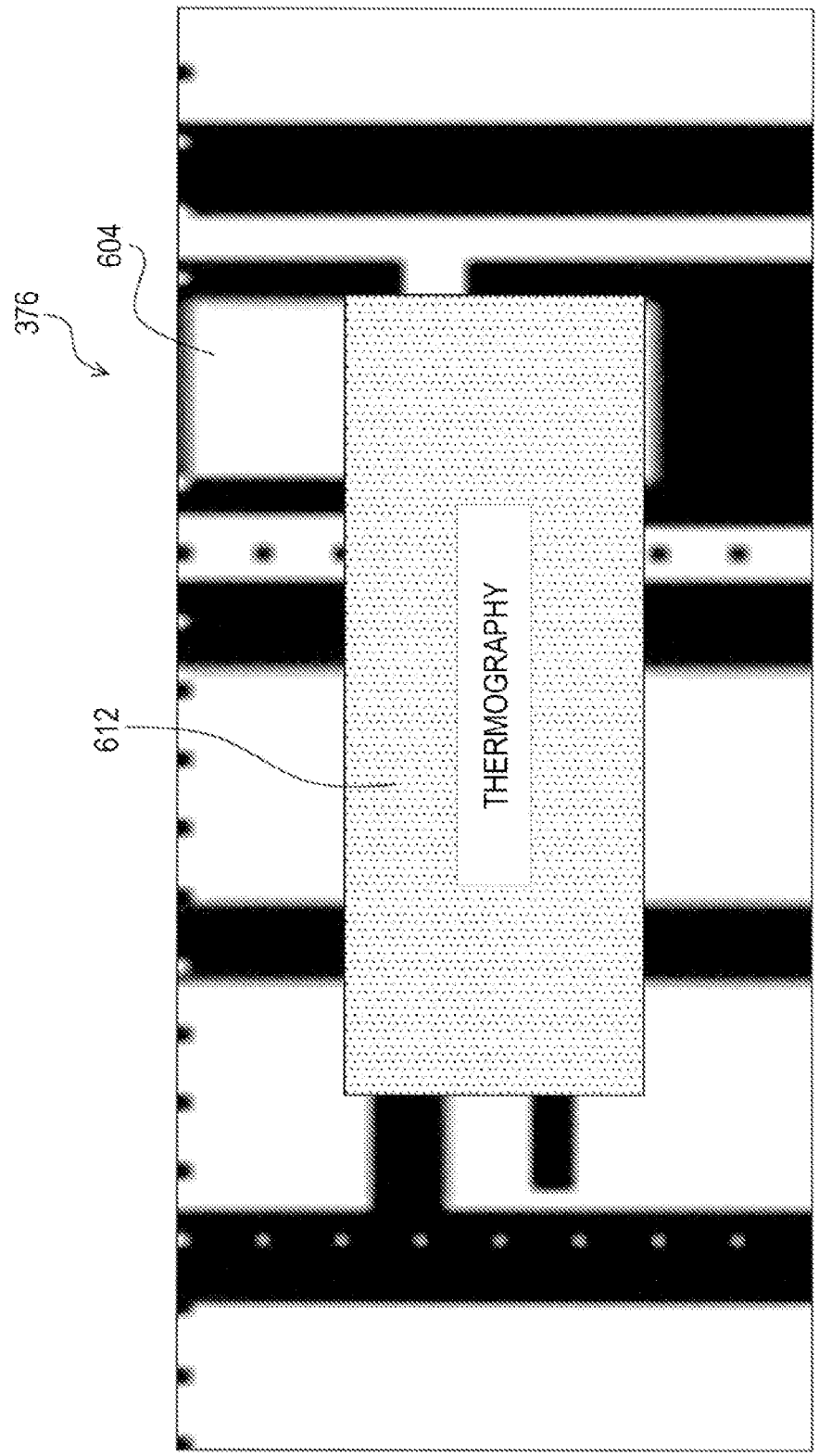
FIG. 20 is a view illustrating a display example of a display on which a thermographic image is superimposed.

FIG. 20 is a view illustrating a display example of the display 376 on which a thermographic image is superimposed. In the illustrated example, on the display 376, a thermographic image 612 is superimposed and displayed in addition to the screen 604 similar to that illustrated in FIG. 12. Note that although the thermographic image 612 is displayed at the center of the display 376 in the illustrated example, the superimposition control unit 312 can freely adjust the display position of the thermographic image 612 on the basis of a command from the manager 20.

As described above, according to the present embodiment, it is possible to acquire a thermographic image of the work site W1 by using the environment measurement unit 163 of the wearable terminal 100, and not only the worker 10 but also the manager 20 can visualize a target site. Therefore early detection of a problem is enabled.

Effects of Embodiment

As described above, in a remote work-support system (1) according to the present embodiment, a first display device (100) includes a first display unit (184, 186) that displays information to a first user (10), a first imaging unit (161) that captures an image in front of the first display device (100) and outputs first image data (V1), and a first communication unit (102) that transmits the first image data (V1) to an information processing device (300), a surrounding imaging device (200) includes a second imaging unit (209, 261, 262) that outputs second image data (V2) including an imaging range different from an imaging range of the first image data (V1), a transmission control unit (201) that reduces or enhances resolution of the second image data (V2) as necessary, and a second communication unit (202) that transmits the second image data (V2) to the information processing device (300), and the information processing device (300) includes a second display device (376, 378) that displays the first and second image data (V1, V2), an operation unit (350) through which data is input, and a third communication unit (302) that transmits data input by the second user (20) through the operation unit (350) to the first display device (100).

As a result, the first and second users (10, 20) can cooperate appropriately.

In addition, the remote work-support system (1) further includes a line-of-sight detection sensor (400) that detects a line-of-sight of the second user (20), and a line-of-sight correspondence control unit (316) that causes the second display device (376, 378) to enlarge and display a portion corresponding to the line-of-sight in the second image data (V2).

As a result, the second user (20) can enlarge and display a desired portion by moving his/her line of sight.

Furthermore, the remote work-support system (1) further includes a scroll control unit (314) that scrolls the second image data (V2) displayed on the second display devices (376, 378), in the left-right direction or the up-down direction, in a case where the line of sight of the second user (20) is in a predetermined state.

Accordingly, the second user (20) can scroll the second image data (V2) by setting the line of sight to a predetermined state.

In addition, the remote work-support system (1) further includes a posture detection unit (500) that detects the posture of the second user (20), and the line-of-sight correspondence control unit (316) causes the second display device (376, 378) to enlarge and display a portion corresponding to the line-of-sight in the second image data (V2) in a case where the posture detection unit (500) detects the predetermined posture of the second user (20).

Thus, when the second user (20) takes a predetermined posture, the portion corresponding to the line of sight can be enlarged and displayed.

Furthermore, the scroll control unit (314) further has a function of scrolling the second image data (V2) displayed on the second display device (376, 378), in the right-left direction or the up-down direction, in a case where the posture detection unit (500) detects a predetermined motion state of the second user (20).

Accordingly, the second user (20) can scroll the second image data (V2) by performing predetermined motion.

Further, the remote work-support system (1) further includes a line-of-sight detection sensor (400) that detects the line of sight of the second user (20), a visual image determination unit (318) that determines which of the first and the second image data (V1, V2) the second user (20) is viewing on the basis of the line of sight detected, and the transmission control unit (112, 212) that controls the data rate of the first or the second image data (V1, V2) or stops transmission, on the basis of the determination result of the visual image determination unit (318).

Thus, for example, in a case where the communication environment deteriorates, the data rate of the first or second image data (V1, V2) can be reduced or transmission can be stopped, and the communication can be continued.

Further, the remote work-support system (1) further includes a screen control unit (114) that notifies the first user (10) of the determination result of the visual image determination unit (318) via the first display units (184, 186).

Thereby, the first user (10) can easily grasp the spot on which the second user (20) focuses his or her eyes.

Further, the remote work-support system (1) further includes a direction display unit (222) that is mounted on the surrounding imaging device (200) and displays the direction corresponding to the coordinate position.

Thus, the first user (10) can easily grasp the spot on which the second user (20) focuses his or her eyes from displayed content on the direction display unit (222).

<Modification>

The present invention is not limited to the embodiment described above, and various modifications are possible. The above-described embodiment is exemplarily illustrated for easy understanding of the present invention, and is not necessarily limited to those having all the configurations described above. Further, another configuration may be added to the configuration of the above-described embodiment, and some of the configurations may be replaced with another configuration. Further, the control lines and information lines illustrated in the drawings indicate those considered necessary for the description, and do not necessarily indicate all the control lines and information lines necessary for a product. In fact, it can be considered that almost all components are interconnected. Possible modifications to the above embodiment are, for example, as follows.

(1) In the above embodiment, an example in which the distance measurement sensor 500 is applied as a specific example of the "posture detection unit" has been described. However, as long as a device can detect the posture or movement of the manager 20, the device can be applied instead of the distance measurement sensor 500. For example, a motion capture system that captures a moving image of the manager 20 and detects the posture of the manager 20 can be applied. Further, a sensor that detects the bending angle of the joint of each part may be attached to the manager 20, and the posture and the movement of the manager 20 may be detected by the sensor.

(2) Since the hardware of the information processing device 300 in the above embodiment can be realized by a general computer, the flowcharts illustrated in FIGS. 15, 16, and 18, other programs for executing the above-described various processes, and the like may be stored in a storage medium or distributed via a transmission path.

(3) The processes illustrated in FIGS. 15, 16, and 18 and other processes described above have been described as software processes using a program in the above-described embodiment. However, the processes may be replaced by hardware processes using an application specific integrated circuit (ASIC), an IC for a specific application, or a field programmable gate array (FPGA).

What is claimed is:

1. A display device that is wearable by a user, the display device comprising:
   a display unit configured to display information to the user;
   an imaging unit whose imaging target is the field of view of the user;
   a measurement unit configured to obtain information on an environment around the user by being disposed near the user, obtain physical information of the user, or obtain the information on the environment and the physical information; and
   a communication unit configured to transmit and receive various data to and from another device via a network, wherein
   in response to transmitting an image captured by the imaging unit to another device via the communication unit and receiving a predetermined instruction via the communication unit, the display device is configured to transmit the obtained information of the measurement unit with the captured image,
   wherein
   the measurement unit includes a function to obtain physical information of the user and estimate an emotion of the user.

2. The display device according to claim 1, wherein
   the measurement unit includes a thermometer, and
   the display device is further configured to generate, based on a measurement result of the thermometer, a thermographic image of a target in the field of view of the imaging unit and transmit the thermographic image via the communication unit.

3. The display device according to claim 1, wherein
   in response to receiving a predetermined instruction via the communication unit, the display device is further configured to transmit an image captured by the imaging unit at a reduced resolution by lowering a data rate at which the image is transmitted.

4. An information processing device that performs management of work of a second user, the information processing device comprising:
   a display unit configured to display image information to a first user;
   a communication unit configured to transmit and receive various data to and from another device via a network; and
   a control unit configured to control the display of the image information, wherein
   the information processing device is configured to receive a first image and a second image via the communication unit and display the first image and the second image on the display unit, the first image capturing a field of view of the second user, and the second image capturing a situation around the second user as captured by a surrounding imaging device disposed near the second user,
   wherein the control unit is further configured to:
   receive a thermographic image of a field of view of the second user received via the communication unit;
   superimpose the thermographic image on the first image with a superimposition control unit; and
   display on the display unit a screen with the first image and the superimposed thermographic image.

5. The information processing device according to claim 4, wherein the control unit includes the superimposition control unit, and the information processing device is further configured to superimpose, with the superimposition control unit, additional information on at least one of the first image or the second image received via the communication unit.

6. An information processing device that performs management of work of a second user, the information processing device comprising:
   a display unit configured to display image information to a first user;
   a communication unit configured to transmit and receive various data to and from another device via a network; and
   a control unit configured to control the display of the image information, wherein
   the information processing device is configured to receive a first image and a second image via the communication unit and display the first image and the second image on the display unit, the first image capturing a field of view of the second user, and the second image capturing a situation around the second user as captured by a surrounding imaging device disposed near the second user, wherein the control unit further includes a visual image determination unit, and the control unit is further configured to use the visual image determination unit to determine which of the first image and the second image the first user is viewing and to detect a coordinate of a position being viewed by the first user.

7. The information processing device according to claim 6, wherein in response to determining with the visual image determination unit that the first user is viewing the first image, the control unit is further configured to transmit a request, via the communication unit, to lower a data rate to a device that transmits the second image.

8. The information processing device according to claim 6, wherein the control unit is further configured to transmit, via the communication unit, to at least one other device at least one of: a determination result of the visual image determination unit on which of the first image and the second image the first user is viewing; or the coordinate of the position the first user is viewing.

9. An information processing device that performs management of work of a second user, the information processing device comprising:

a display unit configured to display image information to a first user;

a communication unit configured to transmit and receive various data to and from another device via a network; and a control unit configured to control the display of the image information, wherein the information processing device is configured to receive a first image and a second image via the communication unit and display the first image and the second image on the display unit, the first image capturing a field of view of the second user, and the second image capturing a situation around the second user as captured by a surrounding imaging device disposed near the second user, wherein the control unit is further configured to:

receive physical information of the second user via the communication unit;

analyze the physical information;

quantify a level of fatigue or stress of the second user as a numerical value; and notify the first user of the numerical value via the display unit.

10. A remote work-support system comprising:

a first information processing device configured to obtain information concerning a first user working at a work site; and a second information processing device configured to be arranged at a different place to where the first information processing device is and operated by a second user, wherein the second information processing device is further configured to be communicable with the first information processing device, the first information processing device includes:

a first imaging unit configured to capture an image in front of the first user and output first image data;

a measurement unit configured to obtain information that includes at least one of information of the first user or information on an environment around the first user; and a communication unit configured to transmit the first image data and the information obtained by the measurement unit, and the second information processing device includes:

a communication unit configured to receive information from the first information processing device; and a display unit configured to display to the second user an image in which the information obtained by the measurement unit is superimposed on the first image data.

* * * * *